United States Patent
Lundberg et al.

(10) Patent No.: US 8,403,792 B2
(45) Date of Patent: Mar. 26, 2013

(54) HYDRAULIC CONTROL SYSTEMS FOR DUAL CLUTCH TRANSMISSIONS

(75) Inventors: Philip C. Lundberg, Keego Harbor, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 704 days.

(21) Appl. No.: 12/603,329

(22) Filed: Oct. 21, 2009

(65) Prior Publication Data

US 2011/0092335 A1    Apr. 21, 2011

(51) Int. Cl.
*F16H 31/00*    (2006.01)
*F16H 3/38*    (2006.01)

(52) U.S. Cl. ............. 475/128; 74/340; 74/329; 74/331; 74/335

(58) Field of Classification Search .............. 74/330, 74/331, 335, 340, 329
See application file for complete search history.

(56) References Cited

U.S. PATENT DOCUMENTS

| | | | |
|---|---|---|---|
| 3,834,499 A | 9/1974 | Candellero et al. | |
| 4,653,352 A | 3/1987 | Nakao et al. | |
| 4,756,213 A * | 7/1988 | Mainquist et al. | 74/335 |
| 4,944,202 A | 7/1990 | Gierer | |
| 5,441,459 A | 8/1995 | Inukai et al. | |
| 6,698,304 B2 | 3/2004 | Gierling et al. | |
| 6,715,597 B1 | 4/2004 | Buchanan et al. | |
| 6,789,658 B2 | 9/2004 | Busold et al. | |
| 6,827,191 B2 | 12/2004 | Kuhstrebe | |
| 6,883,394 B2 | 4/2005 | Koenig et al. | |
| 6,941,830 B2 | 9/2005 | Ibamoto et al. | |
| 7,300,375 B2 | 11/2007 | Petrzik | |
| 7,401,689 B2 | 7/2008 | Hegerath et al. | |
| 7,464,617 B2 | 12/2008 | Baldascini et al. | |
| 7,464,618 B2 | 12/2008 | Mohlmann et al. | |
| 7,472,616 B2 | 1/2009 | Dreher et al. | |
| 7,478,572 B2 | 1/2009 | Maten et al. | |
| 7,487,866 B2 | 2/2009 | Kruse et al. | |
| 7,591,203 B2 | 9/2009 | Ochi et al. | |
| 7,736,269 B2 * | 6/2010 | Long et al. | 74/335 |
| 2001/0036878 A1 | 11/2001 | Itou et al. | |
| 2002/0060113 A1 | 5/2002 | Harries | |
| 2002/0119864 A1 | 8/2002 | Harries | |
| 2002/0148310 A1 * | 10/2002 | Uchino | 74/335 |
| 2003/0075408 A1 | 4/2003 | Alfredsson | |
| 2003/0226416 A1 | 12/2003 | Umemoto et al. | |
| 2004/0038765 A1 | 2/2004 | Fujimine et al. | |
| 2005/0067251 A1 | 3/2005 | Braford, Jr. et al. | |
| 2005/0107214 A1 | 5/2005 | Koenig | |

(Continued)

FOREIGN PATENT DOCUMENTS

DE    2141564 A1    2/1973
DE    4117736 C1    5/1992

(Continued)

*Primary Examiner* — David D Le
*Assistant Examiner* — Derek D Knight

(57) ABSTRACT

The present invention comprehends a plurality of embodiments of a hydraulic control system for various configurations of dual clutch transmissions. The hydraulic control systems all include a regulated source of pressurized hydraulic fluid including an electric pump, a filter and an accumulator, a pair of pressure control valves and a branching hydraulic circuit including pressure or flow control valves, spool or logic valves and two position valves which collectively supply and exhaust hydraulic fluid from a plurality of shift actuators. The actuators are connected to shift rails which include shift forks and are slidable to engage synchronizers and positive clutches associated with the various gear ratios.

21 Claims, 13 Drawing Sheets

U.S. PATENT DOCUMENTS

| | | |
|---|---|---|
| 2007/0175726 A1 | 8/2007 | Combes et al. |
| 2008/0190228 A1* | 8/2008 | Long et al. ............... 74/331 |
| 2008/0207392 A1 | 8/2008 | Staudinger et al. |
| 2008/0210032 A1 | 9/2008 | Uberti et al. |
| 2008/0223683 A1 | 9/2008 | Grethel |
| 2009/0000897 A1 | 1/2009 | Staudinger et al. |
| 2009/0151495 A1 | 6/2009 | Garabello et al. |
| 2009/0157271 A1 | 6/2009 | Garabello et al. |
| 2011/0056314 A1* | 3/2011 | Lundberg et al. ......... 74/473.11 |
| 2011/0056315 A1* | 3/2011 | Lundberg et al. ......... 74/473.11 |
| 2011/0077122 A1* | 3/2011 | Lundberg et al. ............ 477/130 |
| 2011/0168510 A1* | 7/2011 | Lundberg et al. ............ 192/3.51 |
| 2011/0198180 A1* | 8/2011 | Momal et al. ............ 192/3.58 |
| 2011/0297499 A1* | 12/2011 | Lundberg et al. ............ 192/3.57 |
| 2012/0138406 A1* | 6/2012 | Lundberg et al. ............ 192/3.58 |
| 2012/0145503 A1* | 6/2012 | Moorman et al. ............ 192/3.58 |
| 2012/0145504 A1* | 6/2012 | Moorman et al. ............ 192/3.58 |

FOREIGN PATENT DOCUMENTS

| | | |
|---|---|---|
| DE | 4320353 A1 | 1/1994 |
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10125172 A1 | 11/2002 |
| DE | 10134115 A1 | 1/2003 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| DE | 102008008454 A1 | 9/2008 |
| DE | 102008058692 A1 | 6/2009 |
| EP | 0477564 A2 | 4/1992 |
| EP | 1400733 A2 | 3/2004 |
| EP | 1433976 A1 | 6/2004 |
| EP | 1469235 A1 | 10/2004 |
| EP | 1519082 A1 | 3/2005 |
| EP | 1589262 A1 | 10/2005 |
| EP | 1645786 A2 | 4/2006 |
| EP | 1767824 A1 | 3/2007 |
| EP | 2151586 A2 | 2/2010 |
| EP | WO2010028745 A2 | 3/2010 |
| FR | 2808065 A1 | 10/2001 |
| JP | 58102851 A | 8/1983 |
| JP | 2007010145 A | 1/2007 |
| WO | WO9705410 A1 | 2/1997 |
| WO | WO9919644 A1 | 4/1999 |
| WO | WO2004097265 A1 | 11/2004 |
| WO | WO2009037170 A1 | 3/2009 |

* cited by examiner

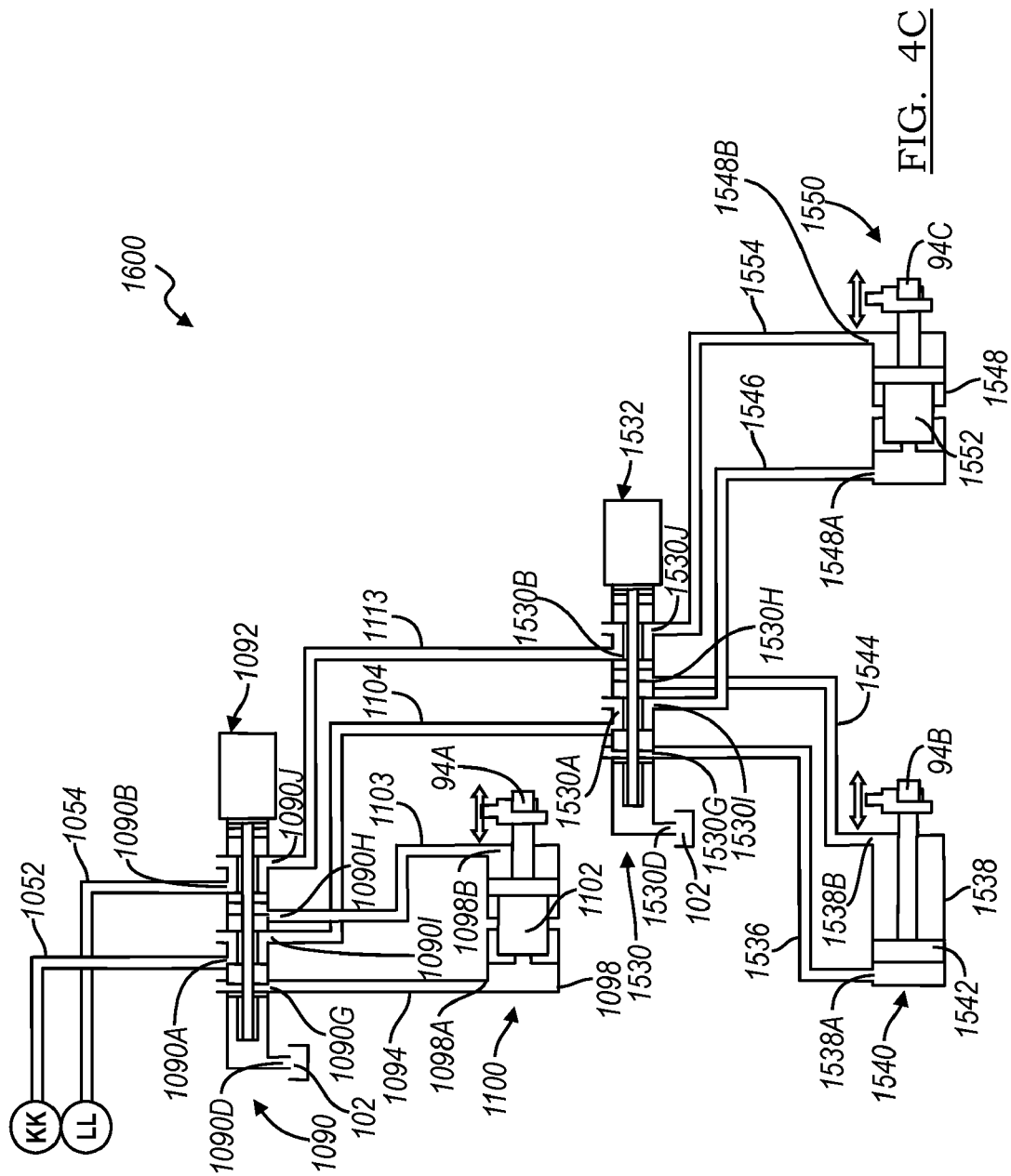

HYDRAULIC CONTROL SYSTEMS FOR DUAL CLUTCH TRANSMISSIONS

FIELD

The present disclosure relates to hydraulic control systems and more particularly to hydraulic control systems and their components for dual clutch transmissions.

BACKGROUND

The statements in this section merely provide background information related to the present disclosure and may or may not constitute prior art.

In automotive transmission art, the dual clutch transmission (DCT) is a relatively new concept. A typical dual clutch transmission configuration includes a pair of mutually exclusively operating input clutches which drive a pair of input shafts. The input shafts may be disposed on opposite sides of an output shaft or may be disposed concentrically between spaced-apart output shafts. One of each of a plurality of pairs of constantly meshing gears which provide the various forward and reverse gear ratios is freely rotatably disposed on one of the shafts and the other of each pair of gears is coupled to one of the other shafts. A plurality of synchronizer clutches selectively couple the freely rotatable gears to the associated shaft to achieve forward and reverse gear ratios. After the synchronizer clutch is engaged, the input clutch associated with the input shaft having the engaged synchronizer clutch is applied to transmit power through the transmission. Reverse gear is similarly achieved except that it includes an additional (idler) gear to provide torque reversal.

Dual clutch transmissions are known for their sporty, performance oriented operating characteristics which mimic those of a conventional mechanical (manual) transmission. They also typically exhibit good fuel economy due to their good gear mesh efficiency, ratio selection flexibility, reduced clutch losses and the lack of a torque converter.

There are, however, design considerations unique to dual clutch transmissions. For example, because of heat generated during clutch slip, the input clutches must be of relatively large size. Furthermore, such heat generation typically requires correspondingly larger and more complex cooling components capable of dissipating relatively large quantities of heat. Finally, because such transmissions typically have many sets of axially aligned, meshing gears, their overall length may limit their use to certain vehicle designs.

Control of the input clutches and selection and engagement of a particular gear by translation of a synchronizer and associated positive clutch is typically achieved by a hydraulic control system. Such a system, itself under the control of an electronic transmission control module (TCM), includes hydraulic valves and actuators which engage the synchronizers and gear clutches. Optimum operating efficiency and thus fuel efficiency and minimal heat generation can be achieved by designing such hydraulic control systems to exhibit low leakage and positive control characteristics. The present invention is so directed.

SUMMARY

The present invention comprehends a plurality of embodiments of a hydraulic control system for various configurations of dual clutch transmissions having two or three countershafts, a third, idler shaft and four or five shift rails and hydraulic actuators. The hydraulic control systems all include a regulated source of pressurized hydraulic fluid including an electric pump, a filter and an accumulator, a pair of pressure control valves and a branching hydraulic circuit including pressure or flow control valves, spool or logic valves and two position valves which collectively supply and exhaust hydraulic fluid from a plurality of shift actuators. The actuators are connected to shift rails which include shift forks and are slidable to engage synchronizers and positive clutches associated with the various gear ratios.

Several of the embodiments define two essentially independent control systems supplied with hydraulic fluid through two independently operating valves. The two independent control systems are associated with respective transmission countershafts and, generally speaking, one countershaft is associated with the even-numbered gears (second, fourth, etc.) and the other countershaft is associated with the odd-numbered gears (first, third, etc.). When the transmission is operating in a normal ascending or descending gear selection sequence, this configuration permits pre-staging or pre-selection of a gear associated with one countershaft while a gear associated with the other countershaft is engaged and transmitting torque. Furthermore, if a component or components associated with one countershaft fail, the other countershaft and the alternating (i.e., first, third, fifth) selection of gear ratios it provides will still be fully operational—a highly desirable failure mode.

The hydraulic control systems according to the present invention are less complex and expensive relative to competing systems, provide improved control through interconnected logic valves which reduce the likelihood of engaging a wrong or multiple gears and provide reduced energy consumption by allowing shut-down of portions of the control system during steady state operation. Certain embodiments of the control system utilize pairs of pressure valves, flow control valves, on/offs or a combination of same to control pressure on both sides of shift actuator pistons which provides better control and improved shifts.

Thus it is an object of the present invention to provide a hydraulic control system for a dual clutch automatic transmission.

It is a further object of the present invention to provide a hydraulic control system for a dual clutch transmission having a plurality of spool or logic valves and hydraulic actuators.

It is a still further object of the present invention to provide a hydraulic control system for a dual clutch transmission having a plurality of two position solenoid valves (on/offs), spool valves and hydraulic actuators.

It is a still further object of the present invention to provide a hydraulic control system for a dual clutch transmission having a plurality of flow or pressure control valves, two position solenoid valves, logic or spool valves and hydraulic actuators.

It is a still further object of the present invention to provide a hydraulic control system for a dual clutch transmission comprising two essentially independent hydraulic systems, each associated with a respective transmission countershaft.

It is a still further object of the present invention to provide a hydraulic control system for a dual clutch transmission having a pair of input clutches associated with a pair of concentric input shafts and a pair of countershafts.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 4A, 4B and 4C are schematic flow diagrams of a third embodiment of a hydraulic control system according to the present invention for a dual clutch automatic transmission;

DETAILED DESCRIPTION

The following description is merely exemplary in nature and is not intended to limit the present disclosure, application, or uses.

Figure 1A:
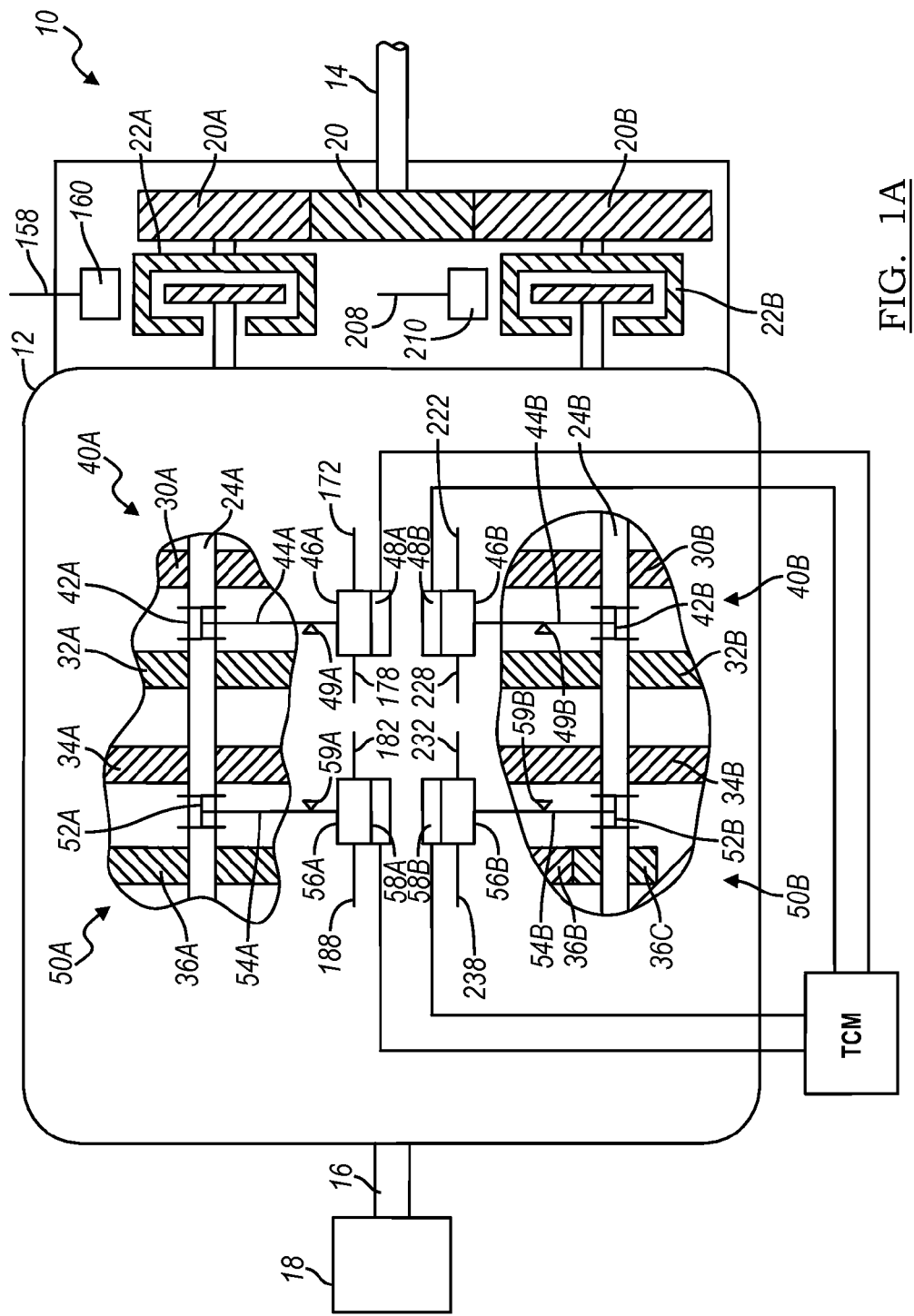
FIG. 1A is a pictorial view of an exemplary dual clutch automatic transmission with portions broken away incorporating a hydraulic control system according to the present invention having four shift actuator assemblies.
Figure 1B:
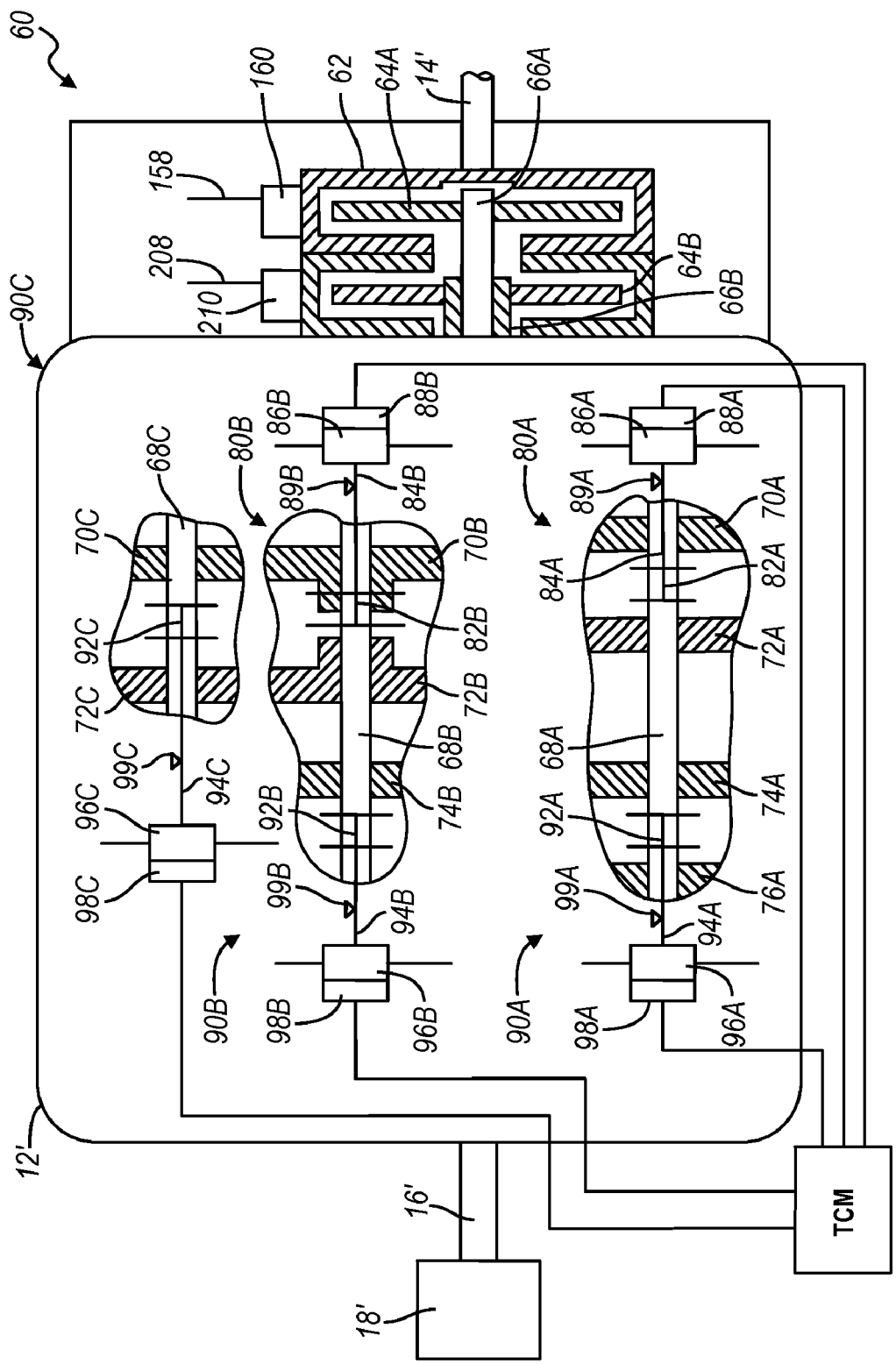
FIG. 1B is a pictorial view of an exemplary dual clutch automatic transmission with portions broken away incorporating a hydraulic control system according to the present invention having five shift actuator assemblies.

With reference now to FIG. 1A, an exemplary dual clutch automatic transmission having four shift actuators and incorporating the present invention is illustrated and generally designated by the reference number 10. The dual clutch transmission 10 includes a typically cast, metal housing 12 which encloses and protects the various components of the transmission 10. The housing 12 includes a variety of apertures, passageways, shoulders and flanges which position and support these components. The transmission 10 includes an input shaft 14 which receives motive power from a prime mover (not illustrated) such as an internal combustion gas or Diesel engine or a hybrid or electric power plant and a single or double output shaft 16 which is coupled to a single or double output assembly 18 which may include, for example, propshafts, differential assemblies and drive axles. The input shaft 14 is coupled to and drives an input drive gear 20 which is in constant mesh with and drives a pair of driven gears, a first driven gear 20A and a second driven gear 20B. A variety of torque transmitting, rotating devices can be used and are within the scope of this invention. The driven gears 20A and 20B, in turn, drive a pair of dry input clutches, a first input clutch 22A and a second input clutch 22B which are mutually exclusively engaged to provide drive torque to a respective pair of layshafts or countershafts, a first countershaft shaft 24A and a second countershaft 24B. The input clutches 22A and 22B may also be a pair of concentric input clutches as illustrated in FIG. 1B and described below.

Freely rotatably disposed about each of the countershafts 24A and 24B are a plurality of helical or spur gears (not illustrated) which are in constant mesh with helical or spur gears which are secured to and rotate with the output shaft 16. A first driven gear on the output shaft 16 meshes with both a drive gear 30A on the first countershaft 24A and a drive gear 30B on the second countershaft 24B. A second driven gear on the output shaft 16 meshes with both a drive gear 32A on the first countershaft 24A and a drive gear 32B on the second countershaft 24B. A third driven gear on the output shaft 16 meshes with both a drive gear 34A on the first countershaft 24A and a drive gear 34B on the second countershaft 24B. A fourth driven gear in the output shaft 16 meshes with both a drive gear 36A on the first countershaft 24A and an idler gear 36B. The idler gear 36B, in turn, meshes with a drive gear 36C the second countershaft 24B to provide torque reversal and thus reverse gear. Other numbers of gear meshes are within the scope of this invention.

Disposed between each adjacent pair of gears on each countershaft 24A and 24B is a shift actuator and synchronizer clutch assembly. Each shift actuator and synchronizer clutch assembly, in accordance with conventional practice, includes a synchronizer assembly which, when activated, synchronizes the speed of a gear to that of the countershaft and a positive clutch, such as a dog or face clutch, which positively connects or couples the gear to the countershaft. Thus, between the gears 30A and 32A on the first countershaft 24A is a first shift actuator and synchronizer clutch assembly 40A having a double, i.e., back-to-back, synchronizer clutch 42A which selectively and exclusively synchronizes and engages one of the gears 30A and 32A to the first countershaft 24A. The first synchronizer clutch 42A is bi-directionally translated by a first shift rail and fork assembly 44A which, in turn, is translated by a first shift actuator assembly 46A. The real time linear position of the first synchronizer clutch 42A and the first shift rail and fork assembly 44A is sensed by a first linear position sensor 48A which preferably provides a continuous, i.e., proportional, output to a transmission control module TCM indicating the present position of the first synchronizer clutch 42A.

Between the gears 34A and 36A on the first countershaft 24A is a second shift actuator and synchronizer clutch assembly 50A having a double, i.e., back-to-back, synchronizer clutch 52A which selectively and exclusively synchronizes and engages one of the gears 34A and 36A to the first countershaft 24A. The second synchronizer clutch 52A is bi-directionally translated by a second shift rail and fork assembly 54A which, in turn, is translated by a second shift actuator assembly 56A. The real time linear position of the second synchronizer clutch 52A and the second shift rail and fork assembly 54A is sensed by a second linear position sensor 58A which preferably provides a continuous, i.e., proportional, output to the transmission control module TCM indicating the present position of the second synchronizer clutch 52A.

Between the gears 30B and 32B on the second countershaft 24B is a third shift actuator and synchronizer clutch assembly 40B having a double, i.e., back-to-back, synchronizer clutch 42B which selectively and exclusively synchronizes and engages one of the gears 30B and 32B to the second countershaft 24B. The third synchronizer clutch 42B is bi-directionally translated by a third shift rail and fork assembly 44B which, in turn, is translated by a third shift actuator assembly 46B. The real time linear position of the third synchronizer clutch 42B and the third shift rail and fork assembly 44B is sensed by a third linear position sensor 48B which preferably provides a continuous, i.e., proportional, output to the transmission control module TCM indicating the present position of the third synchronizer clutch 42B.

Between the gears 34B and 36C on the second countershaft 24B is a fourth shift actuator and synchronizer clutch assembly 50B having a double, i.e., back-to-back, synchronizer clutch 52B which selectively and exclusively synchronizes and engages one of the gears 34B and 36C to the second countershaft 24B. The fourth synchronizer clutch 52B is bi-directionally translated by a fourth rail and fork assembly 54B which, in turn, is translated by a fourth actuator assembly 56B. The real time linear position of the fourth synchronizer clutch 52B and the fourth shift rail and fork assembly 54B is sensed by a fourth linear position sensor 58B which preferably provides a continuous, i.e., proportional, output to the transmission control module TCM indicating the present position of the fourth synchronizer clutch 52B. It should be appreciated that the linear position sensors 48A, 48B, 58A and 58B may be replaced with two or three position switches or open loop control with system characterization.

Additionally, a detent mechanism may be employed with each of the shift assemblies to assist obtaining and maintaining a given gear or speed ratio once it is selected and to assist obtaining and maintaining the synchronizer clutch in neutral, i.e., an unengaged position. Thus, a first detent assembly 49A may be operatively associated with the first shift actuator and synchronizer clutch assembly 40A. A second detent assembly 59A may be operatively associated with the second shift actuator and synchronizer clutch assembly 50A. A third detent assembly 49B may be operatively associated with the third shift actuator and synchronizer clutch assembly 40B and a fourth detent assembly 59B may be operatively associated with the fourth shift actuator and synchronizer clutch assembly 50B.

With reference to FIG. 1B, a second exemplary dual clutch automatic transmission incorporating the present invention is illustrated and generally designated by the reference number 60. The dual clutch transmission 60 includes a typically cast, metal housing 12' which encloses and protects the various components of the transmission 60. The housing 12' includes a variety of apertures, passageways, shoulders and flanges (not illustrated) which position and support the components of the transmission 60. The transmission 60 includes an input shaft 14' which receives motive power from a prime mover (not illustrated) such as an internal combustion gas or Diesel engine or a hybrid or electric power plant and a single or double output shaft 16' which drives a final drive assembly 18' which may include a propshaft, a differential and drive axles. The input shaft 14' is coupled to and drives a clutch housing 62. The clutch housing 62, in turn, drives a pair of concentrically disposed dry input clutches, a first input clutch 64A and a second input clutch 64B which are mutually exclusively engaged to provide drive torque to a respective pair of concentric input members, a first or inner input shaft 66A and a second or outer hollow input shaft or quill 66B.

Secured to and rotating with each of the input members 66A and 66B are a plurality of helical or spur gears (not illustrated) which are in constant mesh with helical or spur gears which are freely rotatably disposed on a first layshaft or countershaft 68A and a parallel, second layshaft or countershaft 68B. Adjacent and parallel to the second countershaft is a third layshaft or countershaft 68C. A first drive gear meshes with a first driven gear 70A on the first countershaft 68A. A second drive gear meshes with a second driven gear 72A on the first countershaft 68A. A third drive gear meshes with a third driven gear 74A on the first countershaft 68A. A fourth drive gear meshes with a fourth driven gear 76A on the first countershaft 68A. A fifth driven gear 70B on the second countershaft 68B meshes with a fifth drive gear 70C on the third countershaft 68C. The second drive gear also meshes with a sixth driven gear 72B on the second countershaft 68B which meshes with a seventh driven gear 72C on the third countershaft 68C. An eighth drive gear meshes with an eighth driven gear 74B on the second countershaft 68B.

Disposed either adjacent certain single gears or between adjacent pairs of gears on the countershafts 68A, 68B and 68C are synchronizer clutch assemblies. Each synchronizer clutch assembly, in accordance with conventional practice, includes a synchronizer assembly which, when activated, synchronizes the speed of a gear to that of the associated countershaft and a positive clutch, such as a dog or face clutch, which positively connects the gear to the shaft. Thus, between the driven gears 70A and 72A on the first countershaft 68A is a first shift actuator and synchronizer clutch assembly 80A having a double, i.e., back-to-back, first synchronizer clutch 82A which selectively and exclusively synchronizes and engages one of the gears 70A and 72A to the first countershaft 68A. The first synchronizer clutch 82A is bi-directionally translated by a first shift rail and fork assembly 84A which, in turn, is translated by a first shift actuator assembly 86A. The real time position of the first synchronizer clutch 82A and the first shift rail and fork assembly 84A is sensed by a first linear position sensor 88A which preferably provides a continuous, i.e., proportional, output signal to a transmission control module TCM indicating the position of the first synchronizer clutch 82A.

Between the fifth driven gear 70B and the sixth driven gear 72B on the second countershaft 68B is a second shift actuator and synchronizer clutch assembly 80B having a single synchronizer clutch 82B which synchronizes and couples the driven gears 70B and 72B together. The second synchronizer clutch 82B is bi-directionally translated by a second shift rail and fork assembly 84B which, in turn, is translated by a second shift actuator assembly 86B. The real time position of the second synchronizer clutch 82B and the second shift rail and fork assembly 84B is sensed by a second linear position sensor 88B which preferably provides a continuous, i.e., proportional, output signal to the transmission control module TCM indicating the position of the second synchronizer clutch 82B.

Between the driven gears 74A and 76A on the first countershaft 68A is a third shift actuator and synchronizer clutch assembly 90A having a double, i.e., back-to-back, third synchronizer clutch 92A which selectively and exclusively synchronizes and engages one of the gears 74A and 76A to the first countershaft 68A. The third synchronizer clutch 92A is bi-directionally translated by a third shift rail and fork assembly 94A which, in turn, is translated by a third shift actuator assembly 96A. The real time position of the third synchronizer clutch 92A and the third shift rail and fork assembly 94A is sensed by a third linear position sensor 98A which preferably provides a continuous, i.e., proportional, output signal to the transmission control module TCM indicating the position of the third synchronizer clutch 92A.

Adjacent the eighth driven gear 74B on the second countershaft 68B is a fourth shift actuator and synchronizer clutch assembly 90B having a single synchronizer clutch 92B which synchronizes and couples the eighth driven gear 74B to the second countershaft 68B. The fourth synchronizer clutch 92B is bi-directionally translated by a fourth shift rail and fork assembly 94B which, in turn, is translated by a fourth shift actuator assembly 96B. The real time position of the fourth synchronizer clutch 92B and the fourth shift rail and fork assembly 94B is sensed by a fourth linear position sensor 98B which preferably provides a continuous, i.e., proportional, output signal to the transmission control module TCM indicating the position of the fourth synchronizer clutch 92B.

Finally, between the fifth drive gear 70C and the seventh driven gear 72C on the third countershaft 68C is a fifth shift actuator and synchronizer clutch assembly 90C having a double, i.e., back-to-back, synchronizer clutch 92C which selectively and exclusively synchronizes and engages the driven gear 72C to the third countershaft 68C or couples the drive gear 70C to the driven gear 72C. The fifth synchronizer clutch 92C is bi-directionally translated by a fifth shift rail and fork assembly 94C which, in turn, is translated by a fifth shift actuator assembly 96C. The real time position of the fifth synchronizer clutch 92C and the fifth shift rail and fork assembly 94C is sensed by a fifth linear position sensor 98C which preferably provides a continuous, i.e., proportional, output signal to the transmission control module TCM indicating the position of the fifth synchronizer clutch 92C. It should be appreciated that the linear position sensors 88A, 88B, 98A, 98B and 98C may be replaced with other sensors such as two or three position switches or open loop control with system characterization.

Additionally, a detent mechanism may be employed with each of the shift assemblies to assist obtaining and maintaining a gear or speed ratio once it is selected and to assist obtaining and maintaining the synchronizer clutch in neutral, i.e., an unengaged position. Thus, a first detent assembly 89A may be operatively associated with the first shift actuator and synchronizer clutch assembly 80A. A second detent assembly 89B may be operatively associated with the second shift actuator and synchronizer clutch assembly 80B. A third detent assembly 99A may be operatively associated with the third shift actuator and synchronizer clutch assembly 90A. A fourth detent assembly 99B may be operatively associated with the fourth shift actuator and synchronizer clutch assembly 90B and a fifth detent assembly 99C may be operatively associated with the fifth shift actuator and synchronizer clutch assembly 90C.

It will be appreciated that the transmission 60 illustrated and described above is laid out with four forward gears on one countershaft and the remaining (three) forward gears and reverse on two other countershafts. It is thus capable of providing seven forward speeds and reverse. Similar configurations, all deemed to be within the scope of this invention may, for example, include six forward speeds (or gears) and one or two reverse speeds (or gears) or five forward speeds and one or two reverse speeds.

It should be understood that while the present invention is directed to hydraulic control systems for dual clutch transmissions, such systems are typically controlled by sensor signals and memory, software and one or more microprocessors contained in a transmission control module TCM. Thus, the transmission control module TCM includes a plurality of inputs which receive data from, for example, the linear position sensors, the pressure sensor, speed sensors and temperature sensors and a plurality of outputs which control and modulate, for example, the positions of the clutches, shift rails and logic solenoid valves.

Just, as noted above, the transmission may include various numbers of forward and reverse speeds or gear ratios, various embodiments of the transmission may include four shift actuators and shift rails or five shift actuators and shift rails and single or double synchronizer clutch assemblies as described herein. Embodiments having four shift rails include four double synchronizer clutch assemblies, typically disposed in pairs on two countershafts, as illustrated in the transmission 10 in FIG. 1A. Embodiments having five shift rails include two single and three double synchronizer clutch assemblies disposed on three countershafts, as illustrated in the transmission 60 in FIG. 1B. Similarly, it should be appreciated that variations in actuator piston design and sensor configuration may result from performance requirements and cost constraints but are considered to be within the purview of the present invention.

Figure 2A:
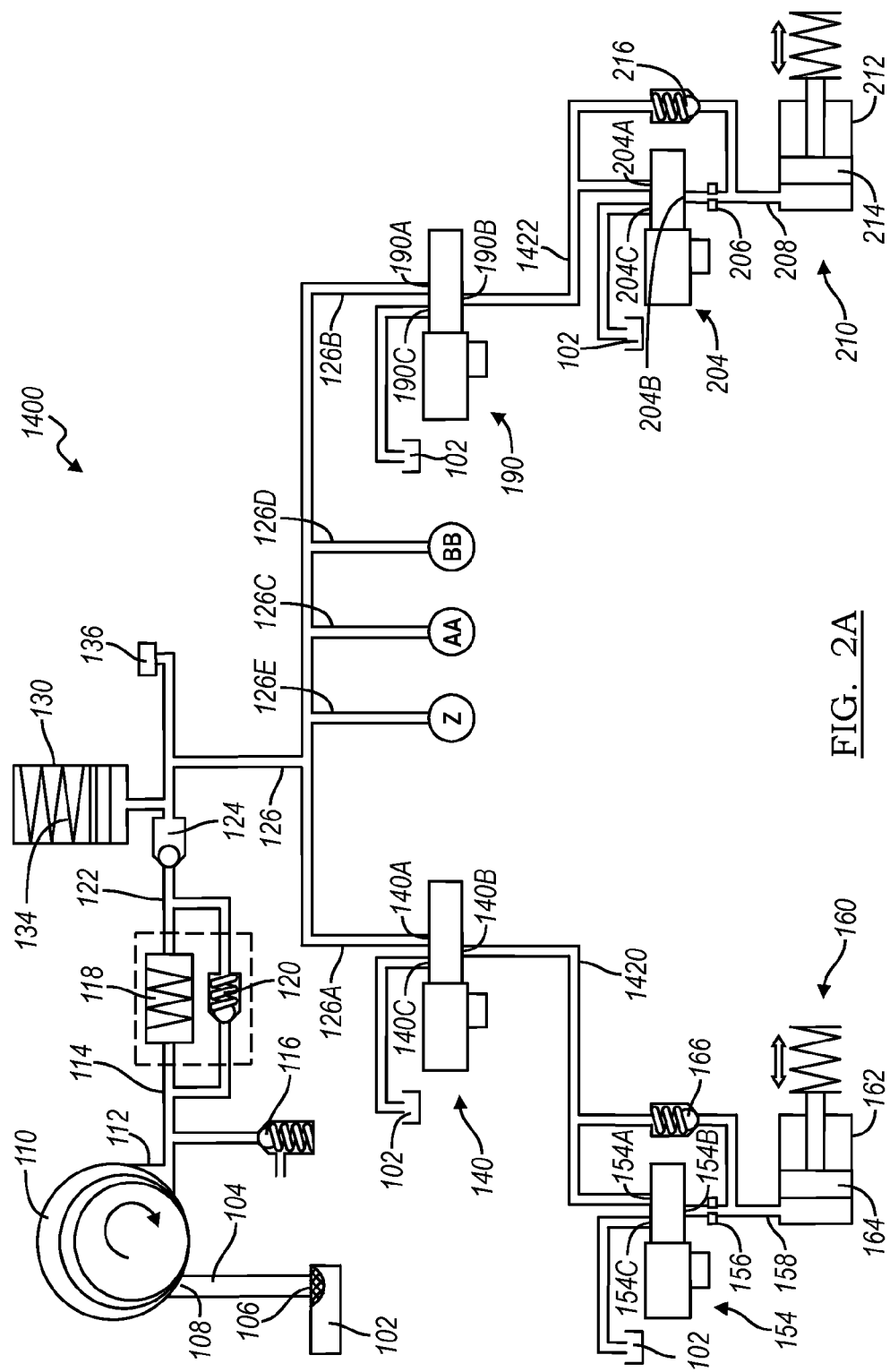
FIGS. 2A and 2B are schematic flow diagrams of a first embodiment of a hydraulic control system according to the present invention for a dual clutch automatic transmission.
Figure 2B:
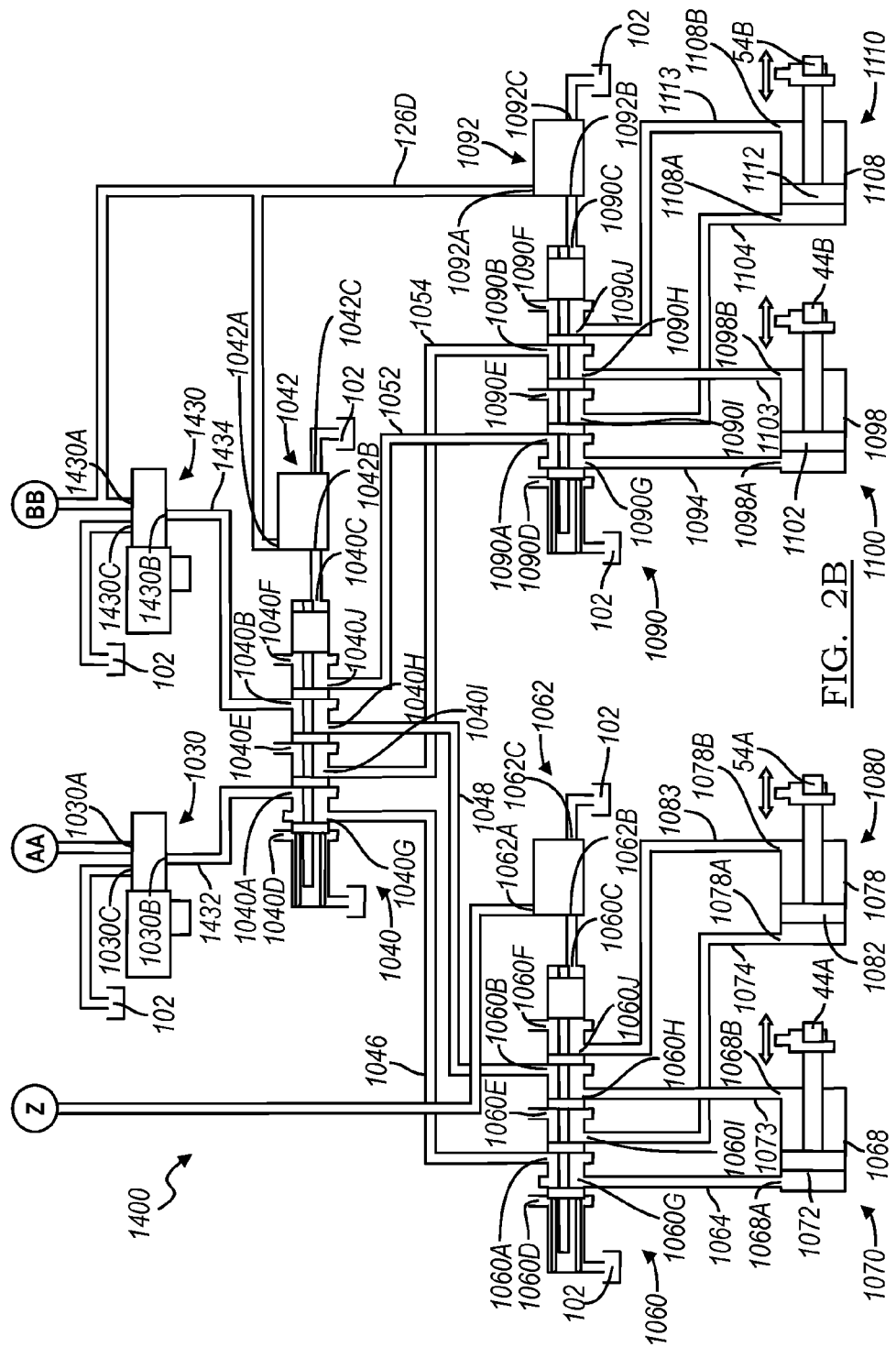

Referring now to FIGS. 1A, 2A and 2B, a first embodiment of a hydraulic control system for the dual clutch automatic transmission 10 described above is illustrated and designated by the reference number 1400. The hydraulic control system 1400 includes a sump 102 to which hydraulic fluid returns and collects from various components and regions of the automatic transmission 10. A suction line 104 which may include a filter 106 communicates with the inlet port 108 of an engine driven or electric pump 110 which may be, for example, a gear pump, a vane pump, a gerotor pump or other positive displacement pump. An outlet port 112 of the pump 110 provides hydraulic fluid under pressure in a supply line 114 to a spring biased blow-off safety valve 116 and to a pressure side filter 118 which is disposed in parallel with a spring biased check valve 120. The safety valve 116 is set at a relatively high predetermined pressure and if the pressure in the supply line 114 exceeds this pressure, the safety valve 116 opens momentarily to relieve and reduce it. If pressure ahead of the filter 118 rises to a predetermined differential pressure, indicating a partial blockage or flow restriction when cold of the filter 118 and the possibility that insufficient hydraulic fluid may be provided in an outlet line 122 to the remainder of the control system 1400, the check valve 120 opens to allow hydraulic fluid to bypass the filter 118. A second check valve 124, in the outlet line 122, is configured to maintain hydraulic pressure in a main supply line 126 and to prevent backflow through the pump 110. The main supply line 126 supplies pressurized hydraulic fluid to an accumulator 130 having a piston 132 and a biasing compression spring 134. The accumulator 130 may be one of many other designs including a gas filled piston accumulator.

The accumulator 130 stores pressurized hydraulic fluid and supplies it to the main supply line 126, to a main or system pressure sensor 136 and to the other components of the control system 1400 thereby eliminating the need for an engine driven pump or for the electric pump 110 to run continuously. The main pressure sensor 136 reads the delivered hydraulic system pressure in real time and provides this data to the transmission control module TCM. It should be appreciated that all of the other embodiments of the hydraulic control system according to the present invention preferably include the same hydraulic supply, filtration and control components just described. Accordingly, these components will be only briefly described in connection with the subsequent figures and embodiments, it being understood that the above description may be referenced to provide details of these components.

The main supply line 126 communicates with a plurality of smaller supply lines. The first supply line 126A communicates with an inlet port 140A of a first electric pressure control solenoid valve 140. The first pressure control solenoid valve 140 also includes an outlet port 140B that communicates with the inlet port 140A when the first control valve 140 is activated or energized and an exhaust port 140C that communicates with the outlet port 140B when the first pressure control valve 140 is de-energized. The exhaust port 140C communicates with the sump 102. The outlet port 140B of the pressure control solenoid valve 140 communicates with a first line 1420 that communicates with the first electric pressure or flow clutch control solenoid valve 154. The first clutch control solenoid valve 154 also includes an outlet port 154B and an exhaust port 154C which communicates with the sump 102. It should be understood that the various exhaust ports may be connected directly to the sump 102 or, if desired, they may be connected to a common exhaust backfill circuit (not illustrated).

When the first clutch control solenoid valve 154 is energized, pressurized hydraulic fluid is provided through a flow restricting orifice 156 in the line 158 to the first clutch piston and cylinder assembly 160. Slidably disposed within a cylinder 162 is a single acting piston 164 which translates to the right in FIG. 2A under hydraulic pressure to engage the first input clutch 22A. To disengage the first input clutch 22A, hydraulic fluid is exhausted through the first clutch control solenoid 154. Disposed in a hydraulic line extending between the first line 1420 and the line 158 is a first clutch pressure limit control valve 166. If pressure within the first clutch piston and cylinder assembly 160 exceeds a predetermined pressure determined by the first pressure control valve 140, the first clutch pressure limit valve 166 opens to relieve and reduce the pressure.

It should be understood that the first clutch pressure limit valve 166 (as well as the second clutch pressure limit valve 216 described below) may be eliminated depending upon various requirements of the control system 1400. It should also be understood that the incorporation or omission of flow control orifices such as the orifice 156 in all the hydraulic lines of the various embodiments is within the scope this invention. The locations and sizes of the flow control orifices are based on operational, software and algorithm requirements.

The second supply line 126B communicates with an inlet port 190A of a second electric pressure control solenoid valve 190. The second pressure control solenoid valve 190 also includes an outlet port 190B that communicates with the inlet port 190A when the first control valve 190 is activated or energized and an exhaust port 190C that communicates with the outlet port 190B when the second pressure control valve 190 is de-energized. The exhaust port 190C communicates with the sump 102. The outlet port 190B communicates with a second line 1422 which communicates with an inlet port 204A of a second electric pressure or flow clutch control solenoid valve 204. The second clutch control solenoid valve 204 also includes an outlet port 204B and an exhaust port 204C which communicates with the sump 102.

When the clutch control solenoid valve 204 is energized, pressurized hydraulic fluid is provided through an orifice 206 in a line 208 to the second clutch piston and cylinder assembly 210. Slidably disposed within a cylinder 212 is a single acting piston 214 which translates to the right in FIG. 2A under hydraulic pressure to engage the second input clutch 22B, illustrated in FIG. 1A and vice versa. Disposed in a hydraulic line extending between the second line 1422 and the line 208 is a second clutch pressure limit control valve 216. If pressure within the second clutch piston and cylinder assembly 210 exceeds a predetermined pressure determined by the second pressure control valve 190, the second clutch pressure limit valve 216 opens to relieve and reduce the pressure.

The first embodiment 1400 of the hydraulic control system also includes a third main supply line 126C which communicates with an inlet port 1030A of a first electric pressure or flow control solenoid valve 1030. An exhaust port 1030C communicates with the sump 102. A fourth supply line 126D communicates with an inlet port 1430A of a second electric pressure or flow control solenoid valve 1430. An exhaust port 1430C communicates with the sump 102. A first line 1432 communicates between an outlet port 1030B of the first electric pressure or flow control solenoid valve 1030 and a first inlet port 1040A of a first spool or logic valve 1040 and a second line 1434 communicates between an outlet port 1430B of the second electric pressure or flow control solenoid valve 1430 and a second inlet port 1040B of the first spool or logic valve 1040.

The first spool or logic valve 1040 includes a control port 1040C, three exhaust ports 1040D, 1040E, and 1040F and four outlet ports 1040G, 1040H, 1040I and 1040J. The fourth supply line 126D also communicates with an inlet port 1042A of a first two position (on-off) solenoid valve 1042. An outlet port 1042B of the first two position solenoid valve 1042 communicates with the control port 1040C at the end of the first logic valve 1040. When the two position solenoid valve 1042 is activated or energized, pressurized hydraulic fluid is supplied to the control port 1040C of the first logic valve 1040, translating the spool to the left as illustrated in FIG. 2B; when the two position solenoid valve 1042 is inactive or de-energized, hydraulic fluid is exhausted from the first logic valve 1040, through the outlet port 1042B and out an exhaust port 1042C to the sump 102, allowing the spool to translate to the right. It should be understood that the devices which translate the spools of the logic valves are not limited to hydraulic on/off valves. For example, the armature of a solenoid may act directly on the logic valve spool. Additionally, a single on/off valve may be multiplexed to actuate multiple logic valves simultaneously. It should also be understood that modifications may be made to the logic valves and ports without changing their function in the control system 1400.

The first spool or logic control valve 1040 includes a first outlet port 1040G which communicates with a first inlet port 1060A of a second spool or logic valve 1060 through a line 1046 and a third outlet port 1040H which communicates with a second inlet port 1060B of the second spool or logic valve 1060 through a line 1048. A fifth supply line 126E connects to an inlet port 1062A of a second two position (on-off) solenoid valve 1062. An outlet port 1062B of the second two position solenoid valve 1062 communicates with a control port 1060C at the end of the second logic valve 1060. It should be appreciated that instead of feeding supply lines 126C, 126D and 126E directly from the accumulator 130, they can be fed by a check valve that multiplexes between the outputs of the electric pressure control valves 140B and 190B in a manner similar to the control system 1500 illustrated in FIG. 3B.

When the second two position solenoid valve 1062 is activated or energized, pressurized hydraulic fluid is supplied to control port 1060C of the second logic valve 1060, translating the spool to the left as illustrated in FIG. 2B; when the two position solenoid valve 1062 is inactive or de-energized, hydraulic fluid is exhausted from the second logic valve 1060, through the outlet port 1062B and out an exhaust port 1062C to the sump 102, allowing the spool to translate to the right. Three exhaust ports 1060D, 1060E and 1060F alternate with the two inlet ports 1060A and 1060B and, although not indicated for reasons of clarity, communicate with the sump 102. The hydraulic lines connecting the logic valves and shift actuators may be in any order or arrangement as long as system operation and functionality is maintained.

A first outlet port 1060G of the second logic valve 1060 communicates through a line 1064 with a first port 1068A of a cylinder 1068 of a first shift actuator piston and cylinder assembly 1070. The first shift actuator piston and cylinder assembly 1070 includes a piston 1072 that is coupled to and drives, for example, the first shift rail and fork assembly 44A and the first synchronizer clutch assembly 42A. The cylinder 1068 also includes a second port 1068B which communicates through a line 1073 with a third outlet port 1060H of the second logic valve 1060. A second outlet port 1060I of the second logic valve 1060 communicates through a line 1074 with a first port 1078A of a cylinder 1078 of a second shift actuator piston and cylinder assembly 1080. The second shift actuator piston and cylinder assembly 1080 includes a piston 1082 that is coupled to and drives, for example, the second shift rail and fork assembly 54A and the second synchronizer clutch assembly 52A. The cylinder 1078 also includes a second port 1078B which communicates through a line 1083 with a fourth outlet port 1060J of the second logic valve 1060. It should be appreciated that the various shift actuator piston and cylinder assemblies may incorporate various designs and geometry, for example, two area pistons and positive neutral, three area pistons, all of which are considered to be within the scope of the present invention. Furthermore, it should be appreciated that a determination of which synchronizer clutch is associated with which shift actuator is dependent upon packaging, failure modes and other design and engineering criteria and that, accordingly, alternate and interchanged configurations of this and the other embodiments are considered to be within the scope of this invention.

Returning to the first spool or logic control valve 1040, it includes a second outlet port 1040I which communicates with a first inlet port 1090A of a third spool or logic valve 1090 through a line 1052 and a fourth outlet port 1040J which communicates with a second inlet port 1090B of the third spool or logic valve 1090 through a line 1054. The fourth supply line 126D connects to an inlet port 1092A of a third two position (on-off) solenoid valve 1092. An outlet port 1092B of the second two position solenoid valve 1092 communicates with a control port 1090C at the end of the third logic valve 1090. Alternatively, the logic valve 1090 can be actuated by the second two position (on-off) solenoid valve 102 if desired.

When the third two position solenoid valve 1092 is activated or energized, pressurized hydraulic fluid is supplied to the control port 1090C of the third logic valve 1090, translating the spool to the left as illustrated in FIG. 2B. When the third two position (on-off) solenoid valve 1092 is de-energized, hydraulic fluid is exhausted from the third logic valve 1090, through the outlet port 1092B of the third two position (on-off) solenoid valve 1092 and out an exhaust port 1092C to the sump 102, allowing the spool to translate to the right. Three exhaust ports 1090D, 1090E and 1090F alternate with the two inlet ports 1090A and 1090B and, although not indicated for reasons of clarity, communicate with the sump 102.

A first outlet port 1090G of the third logic valve 1090 communicates through a line 1094 with a first port 1098A of a cylinder 1098 of a third shift actuator piston and cylinder assembly 1100. The third shift actuator piston and cylinder assembly 1100 includes a piston 1102 that is coupled to and drives, for example, the third shift rail and fork assembly 44B and the third synchronizer clutch assembly 42B. The cylinder 1098 also includes a second port 1098B which communicates through a line 1103 with a third outlet port 1090H of the third logic valve 1090. A second outlet port 1090I of the third logic valve 1090 communicates through a line 1104 with a first port 1108A of a cylinder 1108 of a fourth shift actuator piston and cylinder assembly 1110. The fourth shift actuator piston and cylinder assembly 1110 includes a piston 1112 that is coupled to and drives, for example, the fourth shift rail and fork assembly 54B and the fourth synchronizer clutch assembly 52B. The cylinder 1108 also includes a second port 1108B which communicates through a line 1113 with a fourth outlet port 1090J of the third logic valve 1090.

Operation of the first embodiment of the hydraulic control system 1400 essentially involves the selection of a desired gear ratio in the transmission 10 by the transmission control module TCM, selection and activation of the pressure control solenoid valves 140 and 190 to provide pressurized hydraulic fluid to the input clutch hydraulic circuits, activation of the pressure or flow control solenoid valves 1030 and 1430 to provide controlled flow and pressure of hydraulic fluid to the logic valves 1040, 1060 and 1090 and activation of the two position (on-off) solenoid valves 1042, 1062 and 1092 to position the logic valve spools to direct pressurized hydraulic fluid flow to the correct sides of the piston and cylinder assemblies 1070, 1080, 1100 and 1110 to translate the shift rails 44A, 44B, 54A and 54B to engage the desired gear. Once this has occurred, the input clutch 22A or 22B associated with the countershaft 24A or 24B of the selected gear is engaged by activation of one of the piston and cylinder assemblies 160 or 210.

A convenient example of operation may be presented by describing same with the spools of the logic valves 1040, 1060 and 1090 in the positions illustrated in FIG. 2B. Activation of the first pressure or flow control solenoid valve 1030 provides hydraulic fluid to the line 1432, through the first logic valve 1040, through the line 1046 to the second logic valve 1060 and through the line 1064 to the port 1068A in the first piston and cylinder assembly 1070. The piston 1072 and the first shift rail 44A will then translate to the right and engage, for example, seventh gear. The shift is completed by engaging the appropriate input clutch. If, on the other hand, the second pressure or flow control solenoid valve 1430 is activated, hydraulic fluid flow occurs through the lines 1434, 1048 and 1073, either returning the first shift rail 44A to neutral or moving the shift rail 44A all the way to the left to the position illustrated in FIG. 2B to engage, for example, fifth gear. The choice of the center (neutral) or left position is commanded by the transmission control module TCM with linear position information from, for example, the first linear position sensor 48A illustrated in FIG. 1A. A similar pattern of valve activation and logic valve spool translation provides the seven forward and reverse gears of the transmission 10. For example, if the first two position solenoid valve 1042 is energized, the spool of the first logic valve 1040 translates to the left, providing all hydraulic fluid flows to the lines 1052 and 1054 and the third logic valve 1090 associated with the third and fourth piston and cylinder assemblies 1100 and 1110.

Referring now to FIGS. 1B, 3A, 3B and 3C, a second embodiment of a hydraulic control system according to the present invention is illustrated and generally designated by the reference number 1500. The second embodiment 1500, while sharing many components with the first embodiment 1000, is intended for use with the seven speed transmission 60 illustrated in FIG. 1B having five shift rails and shift actuators. The second embodiment 1500 of the hydraulic control system, as stated, includes, in common with the other embodiments, the pump 110, preferably electric, the filters 106 and 118, the accumulator 130 and the other components of the hydraulic fluid supply and thus they will not be further described.

The second embodiment 1500 of the hydraulic control system includes the main supply line 126 which bifurcates into a first main supply line 126A and a second main supply line 126B. The first main supply line 126A communicates with the inlet port 140A of the first pressure control solenoid valve 140 and the second main supply line 126B communicates with the inlet port 190A of the second pressure control solenoid valve 190. The outlet port 140B of the first pressure control solenoid valve 140 communicates with the first manifold 1002 and the outlet port 190B of the second pressure control solenoid valve 190 communicates with the second manifold 1004.

Similarly, the second embodiment 1500 includes the components associated with activation of the first clutch 64A, such as the first electric pressure or flow clutch control solenoid valve 154 which receives hydraulic fluid from a first branch 1002A of the first manifold 1002, the orifice 156, the first clutch piston and cylinder assembly 160 and the first clutch pressure limit control valve 166 which communicates with the second branch 1002B of the first manifold 1002 as well as the components associated with activation of the second clutch 64B, such as the second electric pressure or flow clutch control solenoid valve 204 which receives hydraulic fluid from the second branch 1004B of the second manifold 1004, the orifice 206, the second clutch piston and cylinder assembly 210 and the second clutch pressure limit control valve 216 which communicates with the third branch 1004C of the second manifold 1004. It should be noted that the first and the second pressure limit control valves 166 and 212 may be eliminated depending upon the requirements of the control system 1500.

Disposed between the first manifold 1002 and the second manifold 1004 is a ball check valve 1510. The ball check valve 1510 includes a first inlet port 1512 connected to the first manifold 1002, a second inlet port 1514 connected to the second manifold 1004 and an outlet port 1516 connected to a branching supply line 1520. The ball check valve 1510 closes off the inlet port delivering the lower hydraulic pressure and provides communication between the inlet port having or delivering the higher hydraulic pressure and the outlet port 1516 and the branching supply line 1520. Cutting off the flow allows either pressure control solenoid 140 or 190 to feed the solenoid valves used for gear actuation and thus allows either pressure control solenoid 140 or 190 to be shut off or operate at lower line pressure while still maintaining the selection of all gear ratios at any time. This configuration also allows the gear actuators to be fed with a lower pressure than the accumulator 130 and will reduce overall system leakage and provide additional failure mode protection.

A first branch 1520A of the branching supply line 1520 communicates with the inlet port 1030A of the first electric pressure or flow control solenoid valve 1030. The outlet port 1030B of the first pressure or flow control solenoid valve 1030 is connected by the line 1432 with the first inlet port 1040A of the first spool or logic control valve 1040. The exhaust port 1030C communicates with the sump 102. The second main supply line 1520B communicates with the inlet port 1430A of the second electric pressure or flow control solenoid valve 1430. The second line 1434 communicates between the outlet port 1430B of the second electric pressure or flow control solenoid valve 1430 and the second inlet port 1040B of the first spool or logic valve 1040. The exhaust port 1430C communicates with the sump 102. As noted above, it should be understood that the exhaust ports throughout the system may be connected directly to the sump 102 or may be connected to a common exhaust backfill circuit (not illustrated).

The first spool or logic valve 1040 includes the control port 1040C which is selectively supplied pressurized hydraulic fluid from the first two position solenoid (on-off) valve 1042 which, in turn, is supplied with hydraulic fluid from a third branch 1520C of the manifold 1520. The first spool or logic valve 1040 also includes the three exhaust ports 1040D, 1040E, and 1040F disposed between and alternating with the inlet ports 1040A and 1040B.

Similar to the first embodiment 1400, the second embodiment 1500 includes the hydraulic lines 1046 and 1048 which communicate between the first and the third outlet ports 1040G and 1040H, respectively, of the first logic valve 1040 and the first and second input ports 1060A and 1060B, respectively, of the second spool or logic valve 1060. The hydraulic lines 1052 and 1054 connect the fourth and the second outlet ports 1040J and 1040I of the first logic valve 1040 to the first and second inlet ports 1090A and 1090B of the third spool or logic valve 1090. Likewise, the second spool or logic valve 1060 includes the control port 1060C, the second two position (on-off) solenoid valve 1062 and the exhaust ports 1060D, 1060E, and 1060F. The inlet port 1062A of the second two position solenoid valve 1062 receives hydraulic fluid through a third branch 1520C of the manifold 1520. The hydraulic line 1064 and the line 1073 communicate with opposite ends of the first, preferably dual area piston and cylinder assembly 1070 which translates the first shift rail and fork assembly 84A and the hydraulic line 1074 and the line 1083 communicate with opposite ends of the second piston and cylinder assembly 1080 which translates the second shift rail and fork assembly 84B.

Similarly, the third spool or logic valve 1090 includes the control port 1090C, the third two-position (on-off) solenoid valve 1092 and the exhaust ports 1090D, 1090E, and 1090F. The inlet port 1092A of the third two position solenoid valve 1092 receives hydraulic fluid through a fourth branch 1520D of the manifold 1520. The hydraulic lines 1094 and 1103 communicate between the first and the third outlet ports 1090G and 1090H, respectively, of the third logic valve 1090 and opposite ends of a third, preferably dual area piston and cylinder assembly 1100 which translates the third shift rail and fork assembly 94A.

The hydraulic line 1104 connected to the second outlet port 1090I communicates with a first inlet port 1530A of a fourth spool or logic valve 1530 and the line 1113 connected to the fourth outlet port 1090J communicates with a second inlet port 1530B of the fourth logic valve 1530. The right end of the fourth logic valve 1530 is selectively supplied with pressurized hydraulic fluid from the output of the second two position (on-off) solenoid valve 1062 in a line 1532. Thus, the spool of the fourth logic valve 1530 translates in unison with the spool of the second logic valve 1060. When the second two position solenoid valve 1062 is energized, both spools translate to the left as viewed in FIGS. 3B and 3C. When the second two position solenoid valve 1062 is de-energized, both spools translate to the right. It should be apparent that actuation of the fourth logic valve 1530 may also be controlled by an fourth two position (on-off) solenoid valve (not illustrated) for better failure modes. This multiplexing of the on-off is possible if the logic valves being controlled are used for controlling a synchronizer clutch in the opposite state of the upstream logic valve 1040.

The fourth logic valve 1530 includes a first outlet port 1530G which communicates through a line 1536 to one end of a fourth piston and cylinder assembly 1540 having a piston 1542 which is coupled to the fourth shift rail and fork assembly 94B. The other end of the fourth piston and cylinder assembly 1542 communicates through a line 1544 to a third outlet port 1530H. Similarly, a second outlet port 15301 communicates through a line 1546 to one end of a fifth, preferably dual area piston and cylinder assembly 1550 having a piston 1552 which is coupled to the fifth shift rail and fork assembly 94C. The other end of the fifth piston and cylinder assembly 1550 communicates through a line 1554 to a fourth outlet port 1530J.

Referring now to FIGS. 1B, 4A, 4B and 4C, a third embodiment of a hydraulic control system according to the present invention is illustrated and generally designated by the reference number 1600. The third embodiment 1600 of the hydraulic control system, as stated, includes, in common with the other embodiments, the pump 110, the filters 106 and 118, the accumulator 130 and the other components of the hydraulic fluid supply and thus they will not be further described.

The third embodiment 1600 is essentially the same as the second embodiment 1500 of the hydraulic control system. The primary difference is the incorporation of spool or logic valves having integrated on-off solenoid operators or solenoids in which the solenoid pendal or plunger acts directly on the logic valve spool instead of controlling a flow of hydraulic fluid into a control port at one end of the spool or logic valve. This reduces the hydraulic circuits and packaging, while potentially reducing leakage. The logic valves themselves are also slightly different and include a central, common exhaust and can be hydraulically actuated. However, there are other logic valves that will achieve the same function and all are deemed to be within the scope of the present invention. Thus, the third embodiment 1600 includes the main supply line 126 which bifurcates into the first main supply line 126A and the second main supply line 126B. The first main supply line 126A communicates with the inlet port 140A of the first pressure control solenoid valve 140 and the second main supply line 126B communicates with the inlet port 190A of the second pressure control solenoid valve 190. The outlet port 140B of the first pressure control solenoid valve 140 communicates with the first manifold 1002 and the outlet port 190B of the second pressure control solenoid valve 190 communicates with the second manifold 1004.

Similarly, the third embodiment 1600 includes the components associated with activation of the first clutch 64A, such as the first electric pressure or flow clutch control solenoid valve 154 which receives hydraulic fluid from the first branch 1002A of the first manifold 1002, the first clutch piston and cylinder assembly 160 and the first clutch pressure limit control valve 166 which communicates with the second branch 1002B of the first manifold 1002 as well as the components associated with activation of the second clutch 64B, such as the second electric pressure or flow clutch control solenoid valve 204 which receives hydraulic fluid from the first branch 1004B' of the second manifold 1004, the second clutch piston and cylinder assembly 210 and the second clutch pressure limit control valve 216 which communicates with the second branch 1004C' of the second manifold 1004.

Disposed between the first manifold 1002 and the second manifold 1004 is the check valve 1510. The check valve 1510 feeds the higher pressure hydraulic fluid into the branching supply line 1520, as noted above. This permits relaxation of hydraulic fluid pressure in part of the transmission 60, while allowing gear ratio selection at any time, lowers leakage by feeding the gear actuator controls with lower pressure hydraulic fluid compared to that provided by the accumulator 130 and provides additional failure mode protection. The first branch 1520A of the branching supply line 1520 communicates with the inlet port 1030A of the first electric pressure or flow control solenoid valve 1030. An outlet port 1030B of the first pressure or flow control solenoid valve 1030 is connected by the line 1432 with the first inlet port 1040A of the first spool or logic control valve 1040. The exhaust port 1030C communicates with the sump 102. The second main supply line 1520B communicates with the inlet port 1430A of the second electric pressure or flow control solenoid valve 1430. The second line 1434 communicates between the outlet port 1430B of the second electric pressure or flow control solenoid valve 1430 and the second inlet port 1040B of the first spool or logic valve 1040. The exhaust port 1430C communicates with the sump 102. Similar to the previous embodiments, the exhaust ports may be connected directly to the sump 102 or, if desired, they may be connected to a common exhaust backfill circuit (not illustrated).

The right end of the spool of the first spool or logic valve 1040 is directly acted upon by a plunger or pedal of the first two position (on-off) solenoid 1042. The first two position solenoid 1042 associated with the first logic valve 1040 may be replaced by a single, cartridge style, direct acting solenoid similar to a pressure control solenoid. The first spool or logic valve 1040 also includes a common exhaust port 1040D disposed at an end opposite the on-off solenoid 1042.

Similar to the second embodiment 1500, the third embodiment 1600 also includes the hydraulic lines 1046 and 1048 to the first and second input ports 1060A and 1060B, respectively, of the second spool or logic valve 1060 and the hydraulic lines 1052 and 1054 to the first and second inlet ports 1090A and 1090B of the third spool or logic valve 1090.

Likewise, the second spool or logic valve 1060 includes the integrated second two position (on-off) solenoid 1062 and the common exhaust port 1060D. The second two position solenoid valve 1062 associated with the second logic valve 1060 may be replaced with a single, cartridge style, direct acting solenoid similar to a pressure control solenoid. The hydraulic lines 1064 and 1073 connected to the first outlet port 1060G and the third outlet port 1060H, respectively, communicate with opposite ends of the first, preferably dual area piston and cylinder assembly 1070 which translates the first shift rail and fork assembly 84A to engage, for example, second and six gears. The lines 1074 and 1083 connected to the second outlet port 1060I and the fourth outlet port 1060J, respectively, communicate with opposite ends of the second piston and cylinder assembly 1080 which translates the second shift rail and fork assembly 84B to engage, for example, fourth gear.

Similarly, the third spool or logic valve 1090 includes the third two position (on-off) solenoid 1092 and the common exhaust port 1090D. The third two position solenoid 1092 associated with the third logic valve 1090 may be replaced with a single, cartridge style, direct acting solenoid similar to a pressure control solenoid. The hydraulic lines 1094 and 1103 connected to the first outlet port 1090G and the third outlet port 1090H, respectively, communicate with opposite ends of the third, preferably dual area piston and cylinder assembly 1100 which translates the third shift rail and fork assembly 94A to engage, for example, fifth and seventh gears.

The hydraulic lines 1104 and 1113 connected to the second outlet port 1090I and the fourth outlet port 1090J, respectively, communicate with the first inlet port 1530A and the second inlet port 1530B, respectively, of the fourth spool or logic valve 1530. A fourth two position (on-off) solenoid 1532 is directly coupled to the spool of the fourth logic valve 1530 and bi-directionally translates it. The fourth two position (on-off) solenoid 1532 associated with the fourth logic valve 1530 may be replaced with a single, cartridge style, direct acting solenoid similar to a pressure control solenoid. The fourth spool or logic valve 1530 includes a common exhaust port 1530D.

The fourth logic valve 1530 includes the first outlet port 1530G which communicates through the line 1536 to one end of the fourth piston and cylinder assembly 1540 having a piston 1542 which is coupled to the fourth shift rail and fork assembly 94B which engages, for example, third gear. The other end of the piston and cylinder assembly 1540 communicates through the line 1544 to the third outlet port 1530H. Similarly, the second outlet port 1530I communicates through the line 1546 to one end of a fifth, preferably dual area piston and cylinder assembly 1550 having a piston 1552 which is coupled to the fifth shift rail and fork assembly 94C which engages, for example, first and reverse gears. The other end of the fifth piston and cylinder assembly 1550 communicates through a line 1554 to a fourth outlet port 1530J.

Referring now to FIGS. 1B, 5A, 5B and 5C, a fourth embodiment of a hydraulic control system according to the present invention is illustrated and generally designated by the reference number 1900. The fourth embodiment 1900 of the hydraulic control system, as stated, includes, in common with the other embodiments, the electric pump 110, the filters 106 and 118, the accumulator 130 and the other components of the hydraulic fluid supply and thus they will not be further described.

Figure 3A:
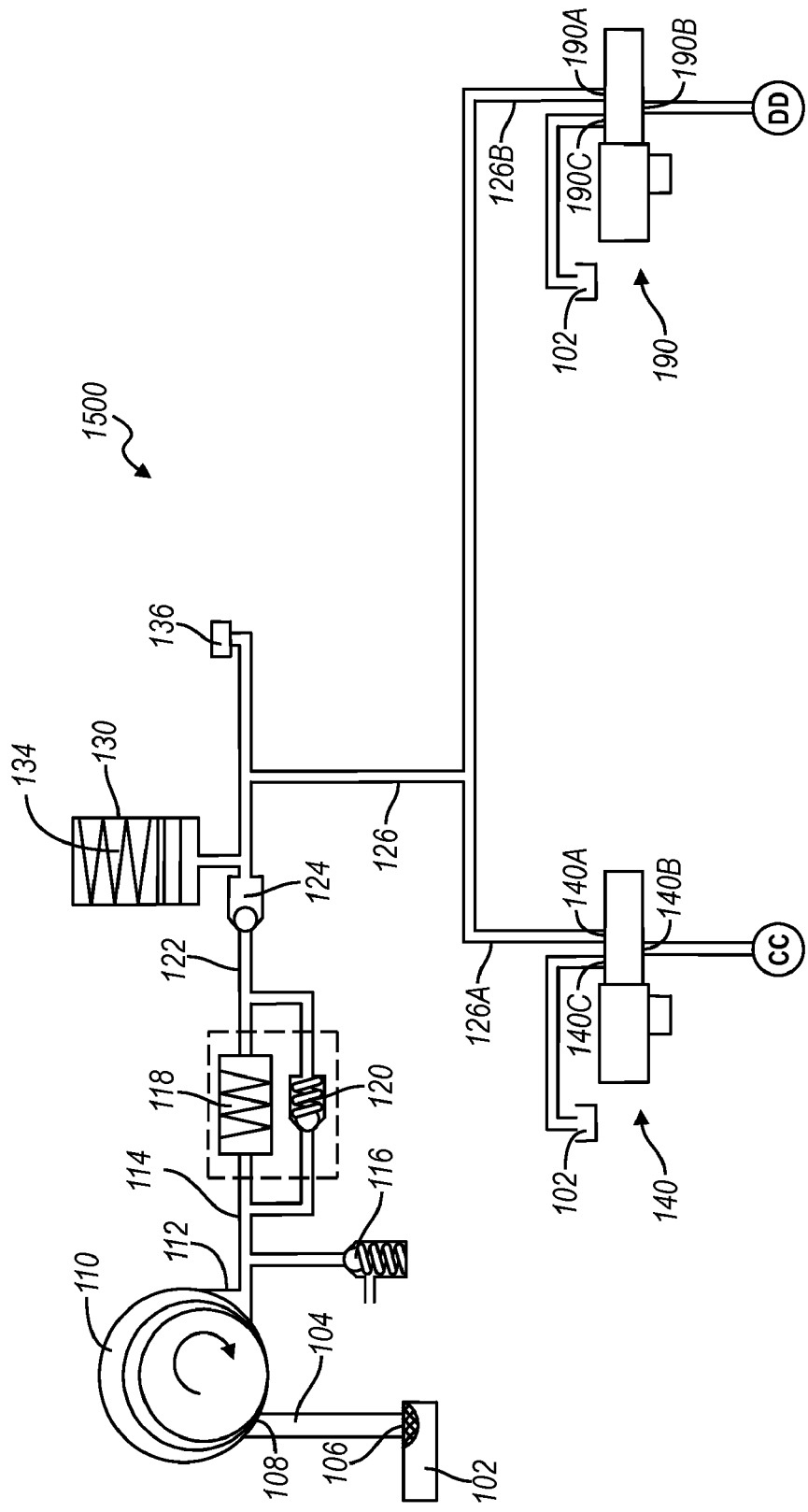
FIGS. 3A, 3B and 3C are schematic flow diagrams of a second embodiment of a hydraulic control system according to the present invention for a dual clutch automatic transmission.
Figure 3B:
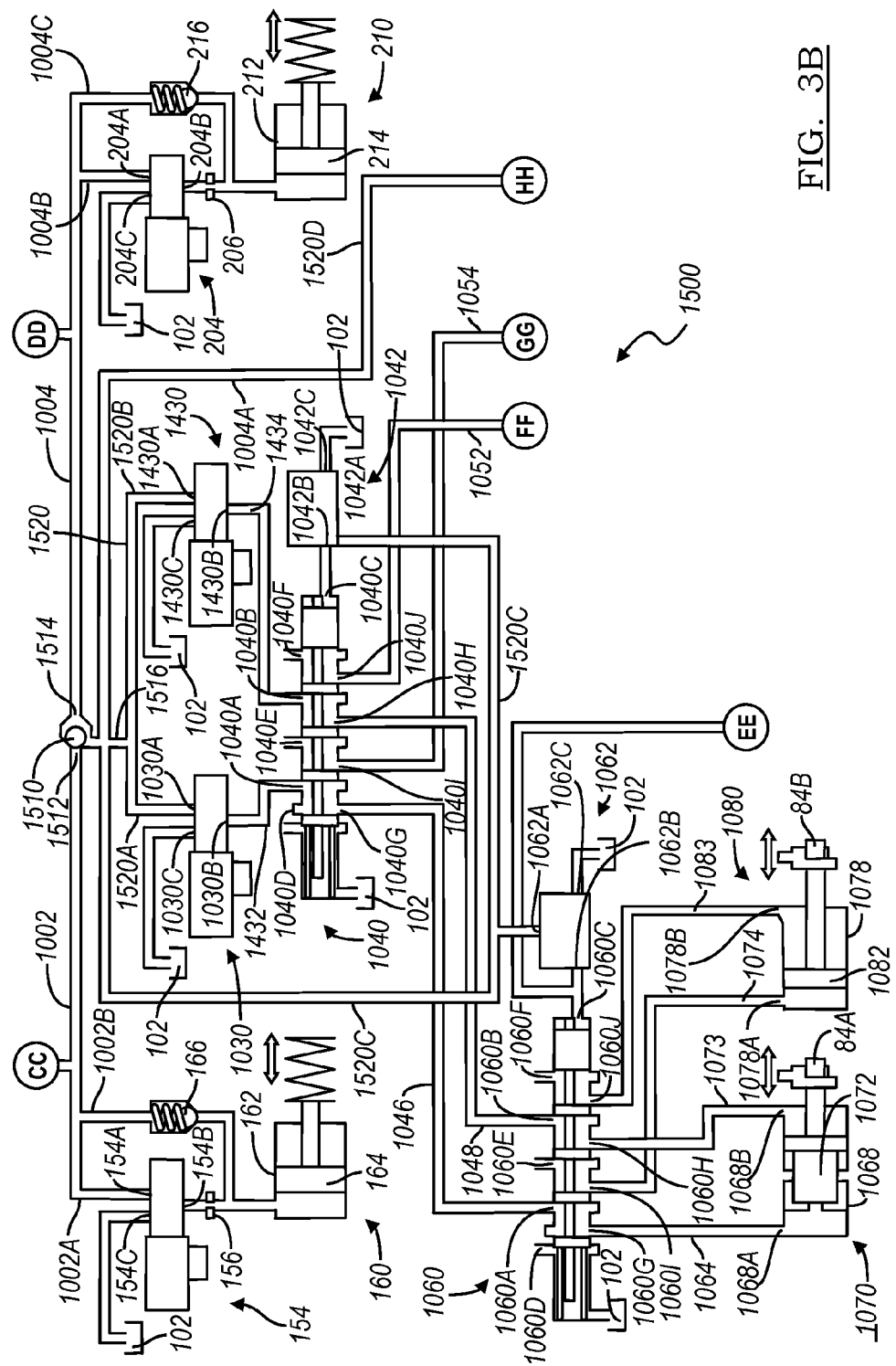
Figure 3C:
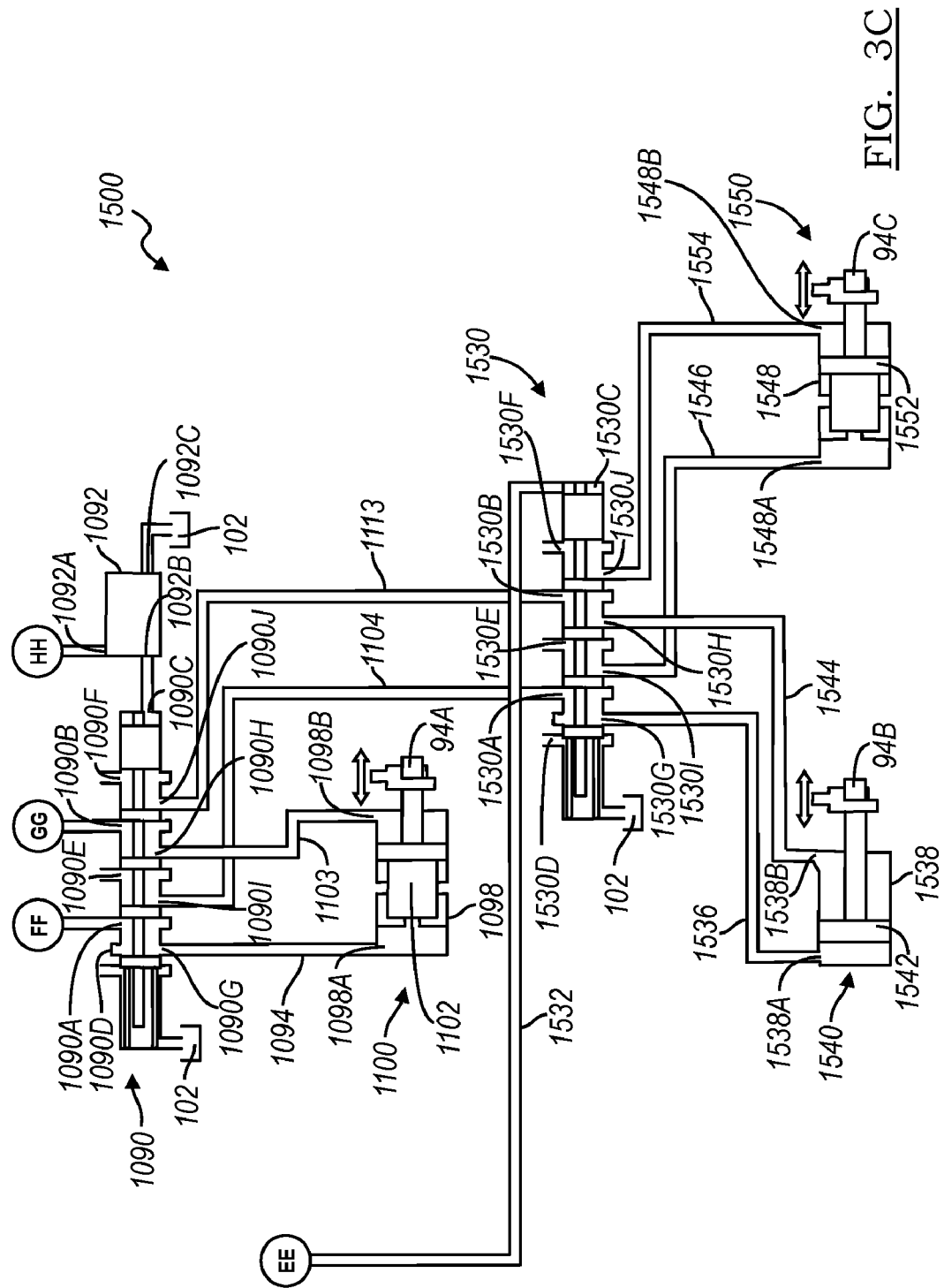
Figure 4A:
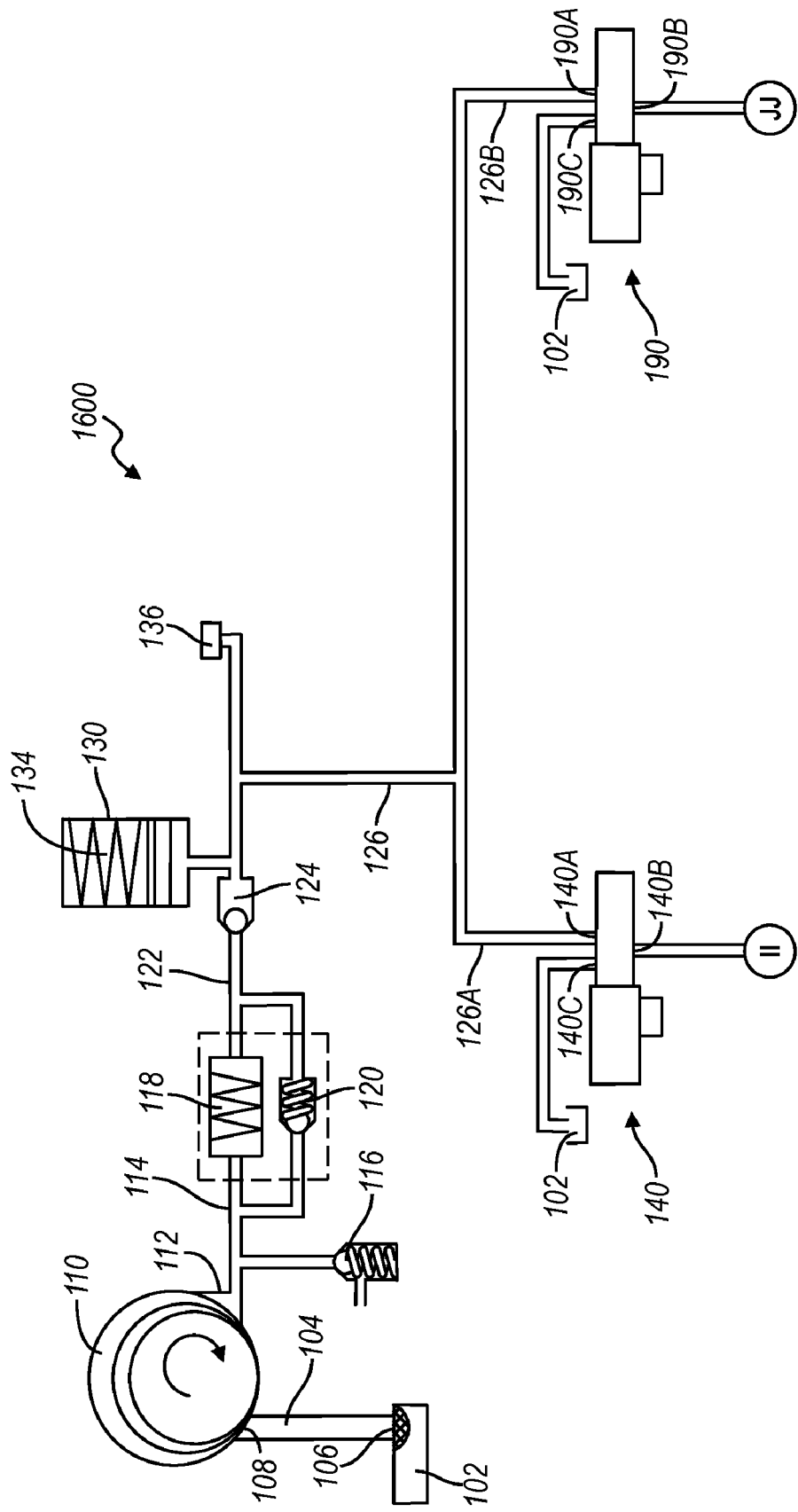
Figure 4B:
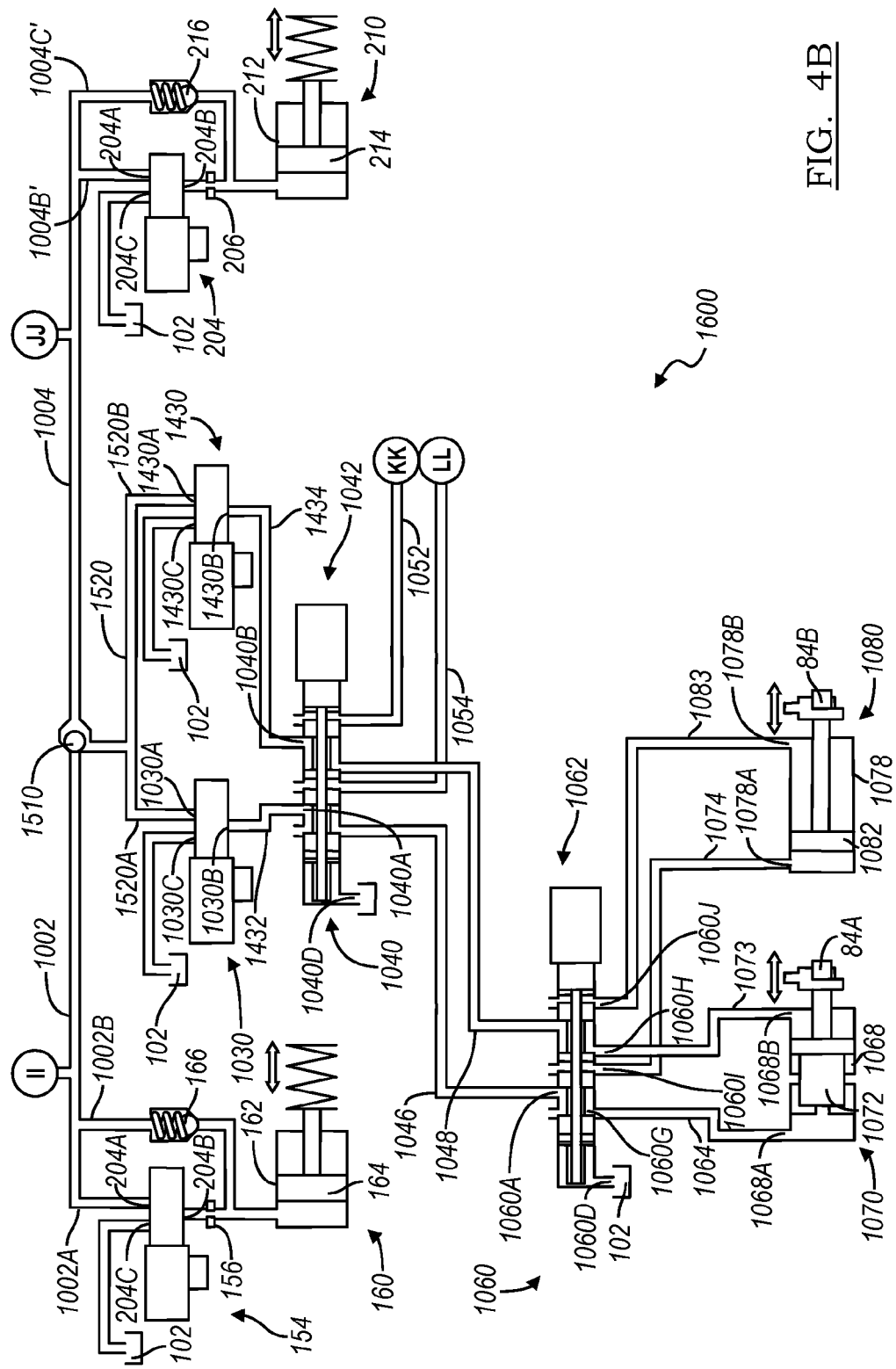
Figure 5A:
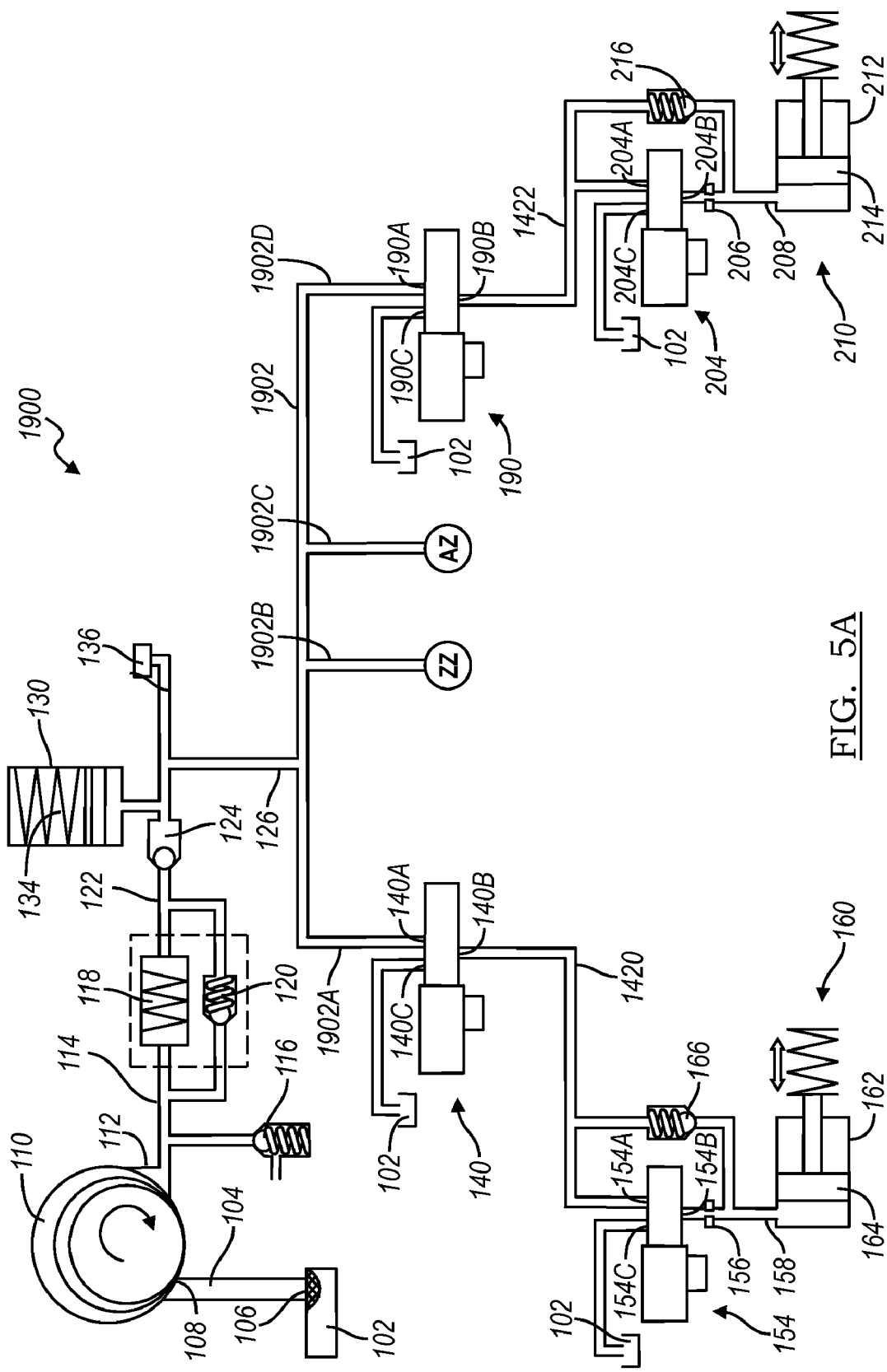
FIGS. 5A, 5B and 5C are schematic flow diagrams of a fourth embodiment of a hydraulic control system according to the present invention for a dual clutch automatic transmission.
Figure 5B:
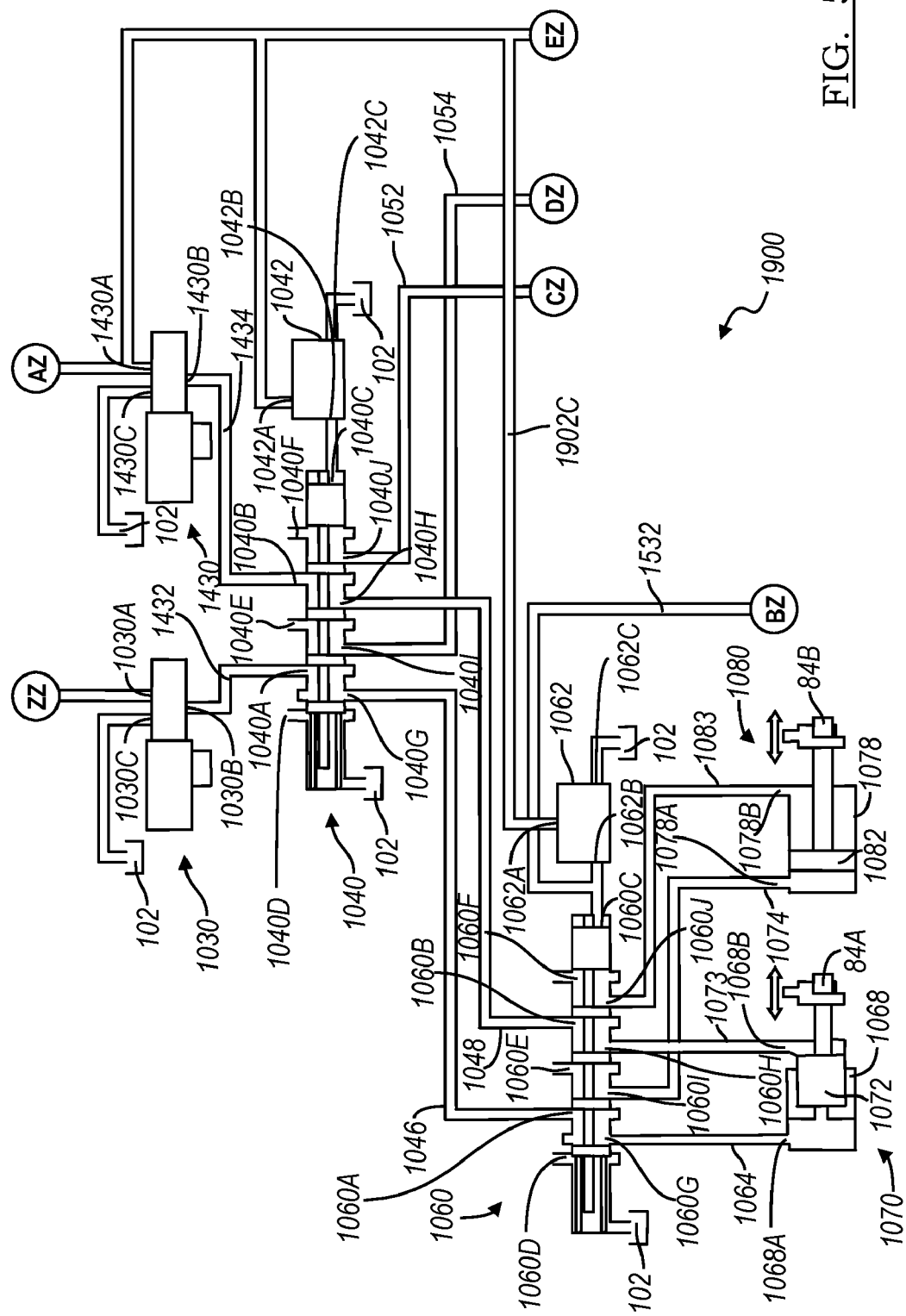
Figure 5C:
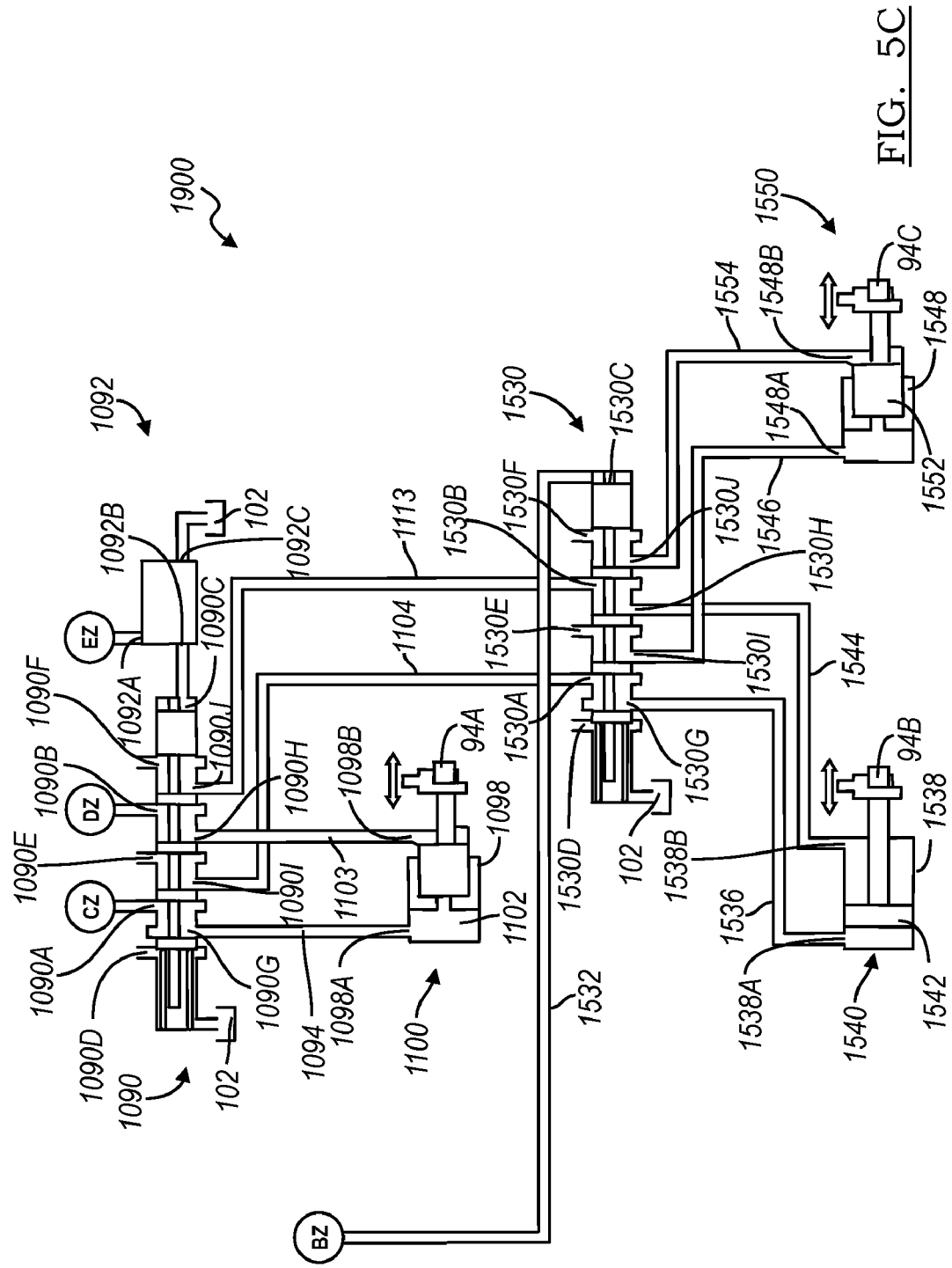

The fourth embodiment 1900 is also similar to the second embodiment 1500 illustrated in FIGS. 3A, 3B and 3C except that the gear actuator control solenoids and the two position control valves are fed directly from the output of the accumulator 130 rather than by either of the pressure control valves 140 or 190 through the check valve 1510. The fourth embodiment 1900 is also similar to the first embodiment 1400 illustrated in FIGS. 2A and 2B with regard to the clutch control circuitry. As such, the main supply line 126 communicates with a manifold 1902 which branches into a plurality of smaller main supply lines. The first branch 1902A communicates with the inlet port 140A of the first electric pressure control solenoid valve 140 which includes an outlet port 140B that communicates with the inlet port 140A when the first control valve 140 is energized. The exhaust port 140C communicates with the outlet port 140B and the sump 102 when the first pressure control valve 140 is de-energized. The outlet port 140B is connected to the first line 1420 which communicates with the inlet port 154A of the first electric pressure or flow clutch control solenoid valve 154. The first clutch control solenoid valve 154 also includes the inlet port 154A, the outlet port 154B and the exhaust port 154C which communicates with the sump 102 or an exhaust backfill circuit.

When the clutch control solenoid valve 154 is energized, pressurized hydraulic fluid is provided through the orifice 156 in the line 158 to the first clutch piston and cylinder assembly 160. Slidably disposed within the cylinder 162 is a single acting piston 164 which translates to the right in FIG. 5A under hydraulic pressure to engage the first input clutch 64A and vice versa.

The fourth branch 1902D of the manifold 1902 communicates with the inlet port 190A of the second electric pressure control solenoid valve 190. The second pressure control solenoid valve 190 also includes the outlet port 190B that communicates with the inlet port 190A when the first control valve 190 is energized and the exhaust port 140C that communicates with the outlet port 190B and the sump 102 when the second pressure control valve 190 is de-energized. The outlet port 190B connects to the second line 1422 which communicates with the inlet port 204A of the second electric pressure or flow clutch control solenoid valve 204. The second clutch control solenoid valve 204 also includes the outlet port 204B and the exhaust port 204C which communicates with the sump 102.

When the clutch control solenoid valve 204 is activated or energized, pressurized hydraulic fluid is provided through the orifice 206 in the line 208 to the second clutch piston and cylinder assembly 210. Slidably disposed within the cylinder 212 is the single acting piston 214 which translates to the right in FIG. 5A under hydraulic pressure to engage the second input clutch 64B and vice versa.

As noted, the main supply line 126 communicates with the branching manifold 1902. The manifold 1902 has a second branch 1902B which supplies hydraulic fluid to the inlet port 1030A of the first pressure or flow control solenoid valve 1030. The branching manifold includes a third branch 1902C which communicates with the inlet port 1430A of the second pressure or flow control solenoid valve 1430, the inlet port 1042A of the first two position (on-off) solenoid valve 1042, the inlet port 1062A of the second two position (on-off) solenoid valve 1062 and the inlet port 1092A of the third two position (on-off) solenoid valve 1092.

An outlet port 1030B of the first pressure or flow control solenoid valve 1030 is connected by the line 1432 with the first inlet port 1040A of the first spool or logic control valve 1040. The exhaust port 1030C communicates with the sump 102. The line 1434 communicates between the outlet port 1430B of the second electric pressure or flow control solenoid valve 1430 and the second inlet port 1040B of the first spool or logic valve 1040. The exhaust port 1430C communicates with the sump 102.

The right end of the first logic valve 1040 is selectively supplied pressurized hydraulic fluid from the first two position (on-off) solenoid valve 1042 which, in turn, is supplied with hydraulic fluid from the third branch 1902C of the manifold 1902. The first logic valve 1040 also includes three exhaust ports 1040D, 1040E, and 1040F disposed between and alternating with the inlet ports 1040A and 1040B.

The fourth embodiment 1900 also includes the hydraulic lines 1046 and 1048 connected to the first outlet port 1040G and the third outlet port 1040H, respectively, which communicate with the first and second input ports 1060A and 1060B, respectively, of the second spool or logic valve 1060 and the hydraulic lines 1052 and 1054 connected to the fourth outlet port 1040J and the second outlet port 1040I, respectively, which communicate with to the first and second inlet ports 1090A and 1090B of the third spool or logic valve 1090.

Likewise, the second logic valve 1060 includes the second two position (on-off) solenoid valve 1062 and the exhaust ports 1060D, 1060E, and 1060F. The inlet port 1062A of the second two position solenoid valve 1062 receives hydraulic fluid through the third branch 1902C of the manifold 1902. The hydraulic lines 1064 and 1073 connected to the first outlet port 1060G and the third outlet port 1060H, respectively, of the second logic valve 1060 communicate with the ports 1068A and 1068B at opposite ends of the first, preferably dual area piston and cylinder assembly 1070 which translates the first shift rail and fork assembly 84A. The hydraulic lines 1074 and 1083 connected to the second outlet port 1060I and the fourth outlet port 1060J, respectively, communicate with the ports 1078A and 1078B at opposite ends of the second piston and cylinder assembly 1080 which translates the second shift rail and fork assembly 84B.

Similarly, the third spool or logic valve 1090 includes the control port 1090C and the three exhaust ports 1090D, 1090E, and 1090F. The inlet port 1092A of the third two position (on-off) solenoid valve 1092 receives hydraulic fluid through the third branch 1902C of the manifold 1902 and it selectively supplies hydraulic fluid through an outlet port 1092B to the control port 1090C of the third logic valve 1090. The lines 1094 and 1103 connected to the first outlet port 1090G and the third outlet port 1090H, respectively, of the third logic valve 1090 communicate with the ports 1098A and 1098B at opposite ends of the third, preferably dual area piston and cylinder assembly 1100 which translates the third shift rail and fork assembly 94A.

The hydraulic lines 1104 and 1113 connected to the second outlet port 1090I and the fourth outlet port 1090J, respectively, of the third logic valve 1090 communicate with the first inlet port 1530A and the second inlet port 1530B, respectively, of the fourth spool or logic valve 1530. The fourth logic valve 1530 includes a control port 1530C which selectively receives hydraulic fluid from the outlet port 1062B of the second two position (on-off) solenoid valve 1062 through the line 1532. The spool of the second logic valve 1060 and the spool of the fourth logic valve 1530 thus translate in unison. When the second two position solenoid valve 1062 is energized, both spools translate to the left as viewed in FIGS. 5B and 5C. When the second two position solenoid valve 1062 is de-energized, both spools translate to the right. The fourth logic valve 1530 also includes three exhaust ports 1530D, 1530E and 1530F which are interleaved with the inlet ports 1530A and 1530B.

The fourth logic valve 1530 includes the first outlet port 1530G which communicates through the line 1536 to the port 1538A at one end of the fourth piston and cylinder assembly 1540 having a piston 1542 which is coupled to the fourth shift rail and fork assembly 94B. The other end of the fourth piston and cylinder assembly 1540 communicates through the port 1538B and the line 1544 to the third outlet port 1530H. Similarly, the second outlet port 15301 communicates through the line 1546 to the port 1548A at one end of the fifth, preferably dual area piston and cylinder assembly 1550 having the piston 1552 which is coupled to the fifth shift rail and fork assembly 94C. The other end of the fifth piston and cylinder assembly 1550 communicates through the port 1548B and the line 1554 to the fourth outlet port 1530J.

It will be appreciated that the hydraulic control systems according to various embodiments of the present invention achieve significant improvements in reduced energy consumption and shift performance not only because of the incorporation of the dedicated electric pump and accumulator but also because of the use of pressure and flow control solenoid valves which allow the majority of the hydraulic system components to be turned off in normal, steady-state, operation. Additionally, these solenoid valves and the linear position sensors on each piston and cylinder shift actuator assembly which provide real time data to the transmission control module regarding the instantaneous positions of the actuators, shift rails and clutches, achieve gear selection and clutch operation that is rapid, positive and efficient without overshoot and wasted energy.

Similarly, the configurations of the various embodiments and the position feedback provided by the linear position sensors permits and facilitates rapid gear sequencing and improved, i.e., reduced, shift times.

Finally, the separation of hydraulic fluid supply and control functions into two regions or sections corresponding to the odd and even gear selecting portions of the transmissions, reduces the likelihood of inaccurate or multiple gear selection and further improves efficiency by permitting shutting down the non-active region or section of the transmission during certain operating situations such as extended operation in the highest gear.

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic control system for a dual clutch transmission comprising, in combination,
a source of pressurized hydraulic fluid including a pump,
a pair of pressure control solenoid valves having inputs communicating with said source of hydraulic fluid and a first output and second output independent of said first output,
a pair of clutch actuator assemblies each in fluid communication with one of said outputs and including a piston and cylinder assembly and a solenoid valve for selectively supplying hydraulic fluid to said piston and cylinder assembly,
first and second pressure or flow control solenoid valves each having inlets connected to said source of hydraulic fluid and respective first and second outlets,
a first logic valve having a first inlet connected to said first output and a second inlet connected to said second output, a plurality of exhaust ports, a control port, a first outlet, a second outlet, a third outlet and a fourth outlet,
a second logic valve having a first inlet connected to said first outlet of said first logic valve, a second inlet connected to said third outlet, a plurality of exhaust ports, a control port, a first outlet, a second outlet, a third outlet and a fourth outlet,
a first gear selection piston and cylinder assembly having a first port connected to said first outlet of said second logic valve and a second port connected to said third outlet of said second logic valve,
a second gear selection piston and cylinder assembly having a first port connected to said second outlet of said second logic valve and a second port connected to said fourth port of said second logic valve,
a third logic valve having a first inlet connected to said second outlet of said first logic valve, a second inlet connected to said fourth outlet of said first logic valve, a plurality of exhaust ports, a control port, a first outlet, a second outlet, a third outlet and a fourth outlet,
a third gear selection piston and cylinder assembly having a first port connected to said first outlet of said third logic valve and a second port connected to said third port of said second logic valve, and
a fourth gear selection piston and cylinder assembly having a first port connected to said second outlet of said third logic valve and a second port connected to said fourth port of said third logic valve.

2. The hydraulic control system of claim 1 further including a two position solenoid valve operably disposed between said source of hydraulic fluid and each of said control ports of said logic valves.

3. The hydraulic control system of claim 1 further including a fourth logic valve and a fifth gear selection piston and cylinder assembly.

4. The hydraulic control system of claim 1 further including a position sensor operably associated with each of said gear selection piston and cylinder assemblies.

5. The hydraulic control system of claim 1 further including a transmission control module having a plurality of inputs and outputs, said outputs operably coupled to said valves and a position sensor for sensing the position of each of said pistons of said gear selection piston and cylinder assemblies and having an output coupled to one of said control module inputs.

6. The hydraulic control system of claim 1 wherein said logic valves each include a valve spool having a plurality of lands.

7. The hydraulic control system of claim 1 further including a check valve assembly having a first inlet communicating with said first output, a second inlet communicating with said second output and an outlet communicating with said first and second inlets of said pressure or flow control solenoid valves.

8. A hydraulic control system for a dual clutch transmission comprising, in combination,
a source of pressurized hydraulic fluid having a pump,
a first pressure control solenoid valve having an inlet communicating with said source of hydraulic fluid and a first outlet,
a second pressure control solenoid valve having an inlet communicating with said source of hydraulic fluid and a second outlet, a first clutch actuator assembly in fluid communication with said first outlet and including a first piston and cylinder assembly and a first solenoid valve for selectively supplying hydraulic fluid to said first piston and cylinder assembly, a second clutch actuator assembly in fluid communication with said second outlet and including a second piston and cylinder assembly and a second solenoid valve for selectively supplying hydraulic fluid to said second piston and cylinder assembly, a check valve having a first inlet communicating with said first outlet, a second inlet communicating with said second outlet and a check valve outlet, a first pressure or flow control solenoid valve having an inlet connected to said check valve outlet and having an outlet, a second pressure or flow control solenoid valve having an inlet connected to said check valve outlet and having an outlet, a first logic valve having a first inlet connected to said outlet of said first pressure or flow control solenoid and a second inlet connected to said outlet of said second pressure or flow control solenoid valve, a plurality of exhaust ports, a control port, a first outlet, a second outlet, a third outlet and a fourth outlet, a second logic valve having a first inlet connected to said first outlet of said first logic valve, a second inlet connected to said third outlet of said first logic valve, a plurality of exhaust ports, a control port, a first outlet, a second outlet, a third outlet and a fourth outlet, a first gear selection piston and cylinder assembly having a first port connected to said first outlet of said second logic valve and a second port connected to said third outlet of said second logic valve, a second gear selection piston and cylinder assembly having a first port connected to said second outlet of said second logic valve and a second port connected to said fourth outlet of said second logic valve, a third logic valve having a first inlet connected to said fourth outlet of said first logic valve and a second inlet connected to said second outlet of said first logic valve, a plurality of exhaust ports, a control port, a first outlet, a second outlet, a third outlet and a fourth outlet, a third gear selection piston and cylinder assembly having a first port connected to said first outlet of said third logic valve and a second port connected to said third outlet of said third logic valve, a fourth logic valve having a first inlet connected to said second outlet of said third logic valve and a second inlet connected to said fourth outlet of said third logic valve, a plurality of exhaust ports, a control port, a first outlet, a second outlet, a third outlet and a fourth outlet, a fourth gear selection piston and cylinder assembly having a first port connected to said first outlet of said fourth logic valve and a second port connected to said third outlet of said fourth logic valve, and a fifth gear selection piston and cylinder assembly having a first port connected to said second outlet of said fourth logic valve and a second port connected to said fourth outlet of said fourth logic valve.

9. The hydraulic control system of claim 8 wherein said inlets of said first and said second pressure or flow control solenoid valves are connected directly to said source of hydraulic fluid.

10. The hydraulic control system of claim 8 further including a position sensor operably associated with each of said gear selection piston and cylinder assemblies.

11. The hydraulic control system of claim 8 further including a transmission control module having a plurality of inputs and outputs, said outputs operably coupled to at least said first and said second pressure or flow control valves and a plurality of linear position sensors for sensing the output of each of said gear selection piston and cylinder assemblies, each of said plurality of linear position sensors having an output coupled to one of said control module inputs.

12. The hydraulic control system of claim 8 further including a first two position solenoid valve having an input communicating with said first outlet of said check valve and an outlet communicating with said control port of said first logic valve, a second two position solenoid valve having an input communicating with said second outlet of said check valve and an outlet communicating with said control ports of said second logic valve and said fourth logic valve, and a third two position solenoid valve having an input communicating with said outlet of said check valve and an outlet communicating with said control port of said third logic valve.

13. The hydraulic control system of claim 8 further including a fourth two position solenoid valve having an input communicating with said outlet of said check valve and an outlet communicating with said control port of said fourth logic valve.

14. The hydraulic control system of claim 8 wherein said source of pressurized hydraulic fluid includes a pump, an accumulator, a filter and a check valve.

15. A hydraulic control system for a dual clutch transmission comprising, in combination,
    a source of pressurized hydraulic fluid including a pump and an accumulator,
    a first pair of pressure control solenoid valves having inlets communicating with said source of hydraulic fluid and a first pair of outputs,
    a pair of clutch actuator assemblies each in fluid communication with a respective one of said first pair of outputs and including a piston and cylinder assembly, a solenoid valve for selectively supplying hydraulic fluid to said piston and cylinder assembly and a check valve disposed between said one of said outputs and said piston and cylinder assembly,
    a second pair of pressure or flow control solenoid valves having inlets communicating with said source of hydraulic fluid and a second pair of outputs,
    a first logic valve having a first inlet port connected to one of said second pair of outputs and a second inlet port connected to another of said second pair of outputs, a plurality of exhaust ports, a control port, and four outlet ports,
    a second logic valve having two inlet ports connected to a first two of said outlet ports of said first logic valve inlet, a plurality of exhaust ports, a control port, and four outlet ports,
    a first gear selection piston and cylinder assembly having a pair of ports connected to a first two of said outlet ports of said second logic valve,
    a second gear selection piston and cylinder assembly having a pair of ports connected to a second two of said outlet ports of said second logic valve,
    a third logic valve having two inlet ports connected to a second two of said outlet ports of said first logic valve inlet, a plurality of exhaust ports, a control port, and four outlet ports
    a third gear selection piston and cylinder assembly having a pair of ports connected to a first two of said outlet ports of said third logic valve, a fourth logic valve having two inlets connected to a second two of said outlet ports of said third logic valve, a plurality of exhaust ports, a control port and four outlet ports, a fourth gear selection piston and cylinder assembly having a pair of ports connected to a first two of said outlet ports of said fourth logic valve, and a fifth gear selection piston and cylinder assembly having a pair of ports connected to a second two of said outlet ports of said fourth logic valve.

16. The hydraulic control system of claim 15 further including a position sensor operably associated with each of said gear selection piston and cylinder assemblies.

17. The hydraulic control system of claim 15 further including a transmission control module having a plurality of inputs and outputs, said outputs operably coupled to said valves and a linear position sensor for sensing the output of each of said gear selection piston and cylinder assemblies having an output coupled to one of said control module inputs.

18. The hydraulic control system of claim 15 further including a passive fluid pressure regulator disposed between said source of pressurized hydraulic fluid and a manifold having a pair of check valves.

19. The hydraulic control system of claim 15 further including a pair of pressure control solenoid valves having inputs communicating with said accumulator and a first output and a second output independent of said first output.

20. The hydraulic control system of claim 15 further including a plurality of solenoid valves each having an inlet port and an outlet port communicating with said control ports.

21. The hydraulic control system of claim 15 wherein said logic valves each include a spool and a solenoid having a plunger connected to and translating said spool.

* * * * *